United States Patent
Han et al.

(10) Patent No.: US 12,557,141 B2
(45) Date of Patent: Feb. 17, 2026

(54) METHODS, DEVICES AND SYSTEMS FOR WIRELESS COMMUNICATION USING MULTI-LINK

(71) Applicant: Samsung Electronics Co., Ltd., Suwon-si (KR)

(72) Inventors: Jonghun Han, Suwon-si (KR); Chulho Chung, Suwon-si (KR); Myeongjin Kim, Suwon-si (KR); Eunsung Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 17/986,384

(22) Filed: Nov. 14, 2022

(65) Prior Publication Data

US 2023/0156796 A1 May 18, 2023

(30) Foreign Application Priority Data

Nov. 15, 2021 (KR) .................. 10-2021-0157094
May 2, 2022 (KR) .................. 10-2022-0054439

(51) Int. Cl.
*H04W 74/0816* (2024.01)
*H04L 1/00* (2006.01)
*H04W 74/08* (2009.01)

(52) U.S. Cl.
CPC ....... *H04W 74/0816* (2013.01); *H04L 1/0008* (2013.01); *H04W 74/0866* (2013.01)

(58) Field of Classification Search
CPC .......... H04W 74/0866; H04W 74/0816; H04L 1/0008
See application file for complete search history.

(56) References Cited

U.S. PATENT DOCUMENTS

| | | |
|---|---|---|
| 10,476,648 B2 | 11/2019 | Kim et al. |
| 10,601,715 B2 | 3/2020 | Merlin et al. |
| 2017/0208625 A1* | 7/2017 | Choi ............... H04W 74/006 |

(Continued)

FOREIGN PATENT DOCUMENTS

| | | |
|---|---|---|
| EP | 3 793 314 A1 | 3/2021 |
| EP | 3 893 589 A1 | 10/2021 |
| WO | WO-2021/141449 A1 | 7/2021 |

OTHER PUBLICATIONS

Extended European Search Report dated Feb. 28, 2023 issued in European Patent Application No. 22207578.0-1215.

(Continued)

*Primary Examiner* — James P Duffy
(74) *Attorney, Agent, or Firm* — Fish & Richardson P.C.

(57) ABSTRACT

A wireless communication method of a first device with a second device using multiple links, including first and second links, the method including obtaining transmission-related information in response to entering a transmission preparation period of a first request-to-send (RTS) frame through the first link, the transmission-related information corresponding to a second RTS frame associated with the second link, determining at least one of an additional length or cross-link-related information of the first RTS frame based on the transmission-related information, and determining whether to transmit the second RTS frame based on the at least one of the additional length of the cross-link-related information of the first RTS frame.

16 Claims, 27 Drawing Sheets

(56) References Cited

U.S. PATENT DOCUMENTS

| | | |
|---|---|---|
| 2021/0007168 A1 | 1/2021 | Asterjadhi et al. |
| 2021/0076419 A1 | 3/2021 | Naribole et al. |
| 2021/0127420 A1 | 4/2021 | Lu et al. |
| 2021/0136819 A1 | 5/2021 | Seok et al. |
| 2021/0195540 A1 | 6/2021 | Fischer |
| 2021/0195578 A1 | 6/2021 | Huang et al. |
| 2021/0211375 A1 | 7/2021 | Kwon et al. |
| 2021/0227529 A1 | 7/2021 | Chu et al. |

OTHER PUBLICATIONS

"Draft Standard for Information technology—Telecommunications and information exchange between systems Local and metropolitan area networks—Specific Requirements" IEEE P802.11beTM/D1.1, Jul. 2021.

"Draft Standard for Information technology—Telecommunications and information exchange between systems Local and metropolitan area networks—Specific Requirements" IEEE P802.11beTM/D1.0, May 2021.

\* cited by examiner

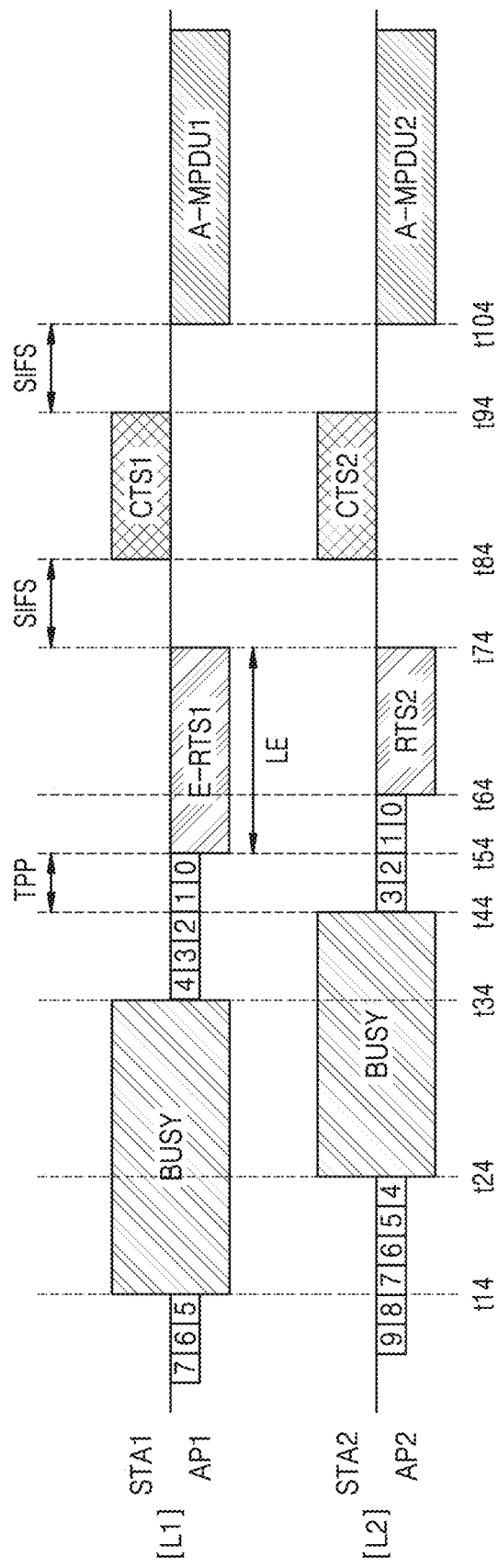

FIG. 9

INFO1

| Name |
|---|
| Link Index |
| Link Sensing Required |
| RU Allocation |
| (Reserved) |

FIG. 11

INFO2

| Name |
|---|
| Link Index |
| Link Sensing Required |
| RU Allocation |
| non-Primary TX |
| (Reserved) |

FIG. 16

Trigger Frame Types
- Basic Trigger frame
- Beamforming Report
- Multi-user block ack request
- <u>Multi-user request to send(Selected)</u>
- Buffer Status Report
- GCR MU-BAR
- Bandwidth Query Report
- NDP Feedback Report Poll

METHODS, DEVICES AND SYSTEMS FOR WIRELESS COMMUNICATION USING MULTI-LINK

CROSS-REFERENCE TO RELATED APPLICATIONS

This application is based on and claims priority under 35 U.S.C. § 119 to Korean Patent Application Nos. 10-2021-0157094, filed on Nov. 15, 2021, and 10-2022-0054439, filed on May 2, 2022 in the Korean Intellectual Property Office, the disclosures of which are incorporated by reference herein in their entirety.

BACKGROUND

The inventive concepts relate to wireless communication, and more particularly, to a device and method for wireless communication using a multi-link.

As an example of wireless communication, a wireless local area network (WLAN) is technology that connects two or more devices by using a wireless signal transmission method. The WLAN technology may be based on the institute of electrical and electronics engineers (IEEE) 802.11 standard. The 802.11 standard evolved into 802.11b, 802.11a, 802.11g, 802.11n, 802.11ac, 802.11ax, etc., and may support a transmission rate of up to 1 Gbyte/s based on orthogonal frequency-division multiplexing (OFDM) technology.

In 802.11ac, data may be simultaneously or contemporaneously transmitted to a plurality of users through a multi-user multi-input multi-output (MU-MIMO) technique. In 802.11ax, which is referred to as high efficiency (HE), multiple access is implemented by dividing and providing available subcarriers to users by applying not only MU-MIMO but also orthogonal frequency-division multiple access (OFDMA) technology. Accordingly, a WLAN system, to which 802.11ax is applied, may effectively support communication in dense areas and outdoors.

In 802.11be, which is referred to as extremely high throughput (EHT), 6 GHz unlicensed frequency band support, bandwidth utilization of up to 320 MHz per channel, introduction of hybrid automatic repeat and request (HARQ), support for up to 16×16 MIMO, and/or the like, are to be implemented. Accordingly, a next-generation WLAN system is expected to effectively support low latency and high-speed transmission, like new radio (NR), which is 5th generation (5G) technology.

SUMMARY

The inventive concepts provide a device and method for improving data reliability in wireless communication by using a multi-link.

According to an aspect of the inventive concepts, there is provided a wireless communication method of a first device with a second device using multiple links, the multiple links including a first link and a second link, the wireless communication method including obtaining transmission-related information in response to entering a transmission preparation period of a first request-to-send (RTS) frame through the first link, the transmission-related information corresponding to a second RTS frame associated with the second link, determining at least one of an additional length or cross-link-related information of the first RTS frame based on the transmission-related information, and determining whether to transmit the second RTS frame based on the at least one of the additional length of the cross-link-related information of the first RTS frame.

According to an aspect of the inventive concepts, there is provided a first device configured to communicate with a second device using multiple links, the multiple links including a first link and a second link, the first device including a radio frequency (RF) integrated circuit configured to provide access points respectively corresponding to the first link and the second link, and processing circuitry configured to obtain transmission-related information in a transmission preparation period of a first request-to-send (RTS) frame through the first link, the transmission-related information corresponding to a second RTS frame associated with the second link, determine at least one of an additional length or cross-link-related information of the first RTS frame based on the transmission-related information, and determine whether to transmit the second RTS frame based on the at least one of the additional length of the cross-link-related information of the first RTS frame.

According to an aspect of the inventive concepts, there is provided a wireless communication system including a first device and a second device, the first device and the second device being configured to communicate with each other through multiple links, wherein the first device is configured to determine at least one of an additional length or cross-link-related information of a first request-to-send (RTS) frame among a plurality of RTS frames based on transmission-related information of the plurality of RTS frames through the multiple links, and generate the first RTS frame based on the at least one of the additional length or cross-link-related information to transmit the first RTS frame to the second device through a first link among the multiple links.

BRIEF DESCRIPTION OF THE DRAWINGS

Embodiments of the inventive concepts will be more clearly understood from the following detailed description taken in conjunction with the accompanying drawings in which:

FIG. 7 is a timing diagram illustrating an example of a multi-link operation, according to embodiments;

FIG. 9 is a table diagram for explaining cross-link-related information, according to embodiments;

FIG. 11 is a table diagram for explaining cross-link-related information, according to embodiments;

FIG. 16 is a diagram for explaining formats of a trigger frame that may be adopted for a format of an RTS frame, according to embodiments;

DETAILED DESCRIPTION

Figure 1:
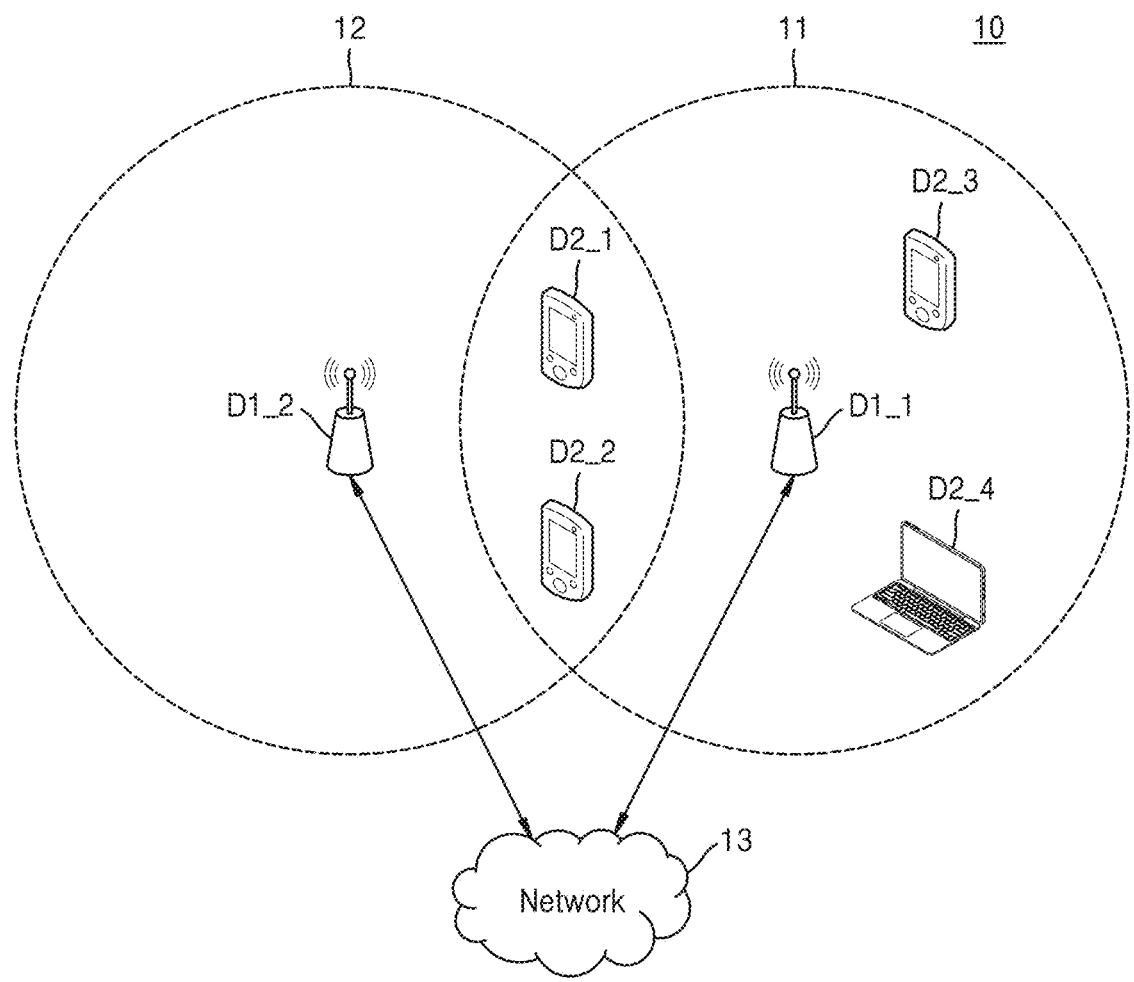
FIG. 1 is a diagram of a wireless communication system according to embodiments.

FIG. 1 is a diagram of a wireless communication system 10 according to embodiments of the inventive concepts. In particular, FIG. 1 shows a wireless local area network (WLAN) system, as an example of the wireless communication system 10.

Hereinafter, embodiments are described based on an orthogonal frequency-division multiplexing (OFDM)-based or orthogonal frequency-division multiple access (OFDMA)-based communication system, in particular, an institute of electrical and electronics engineers (IEEE) standard, but in the inventive concepts, other communication systems having a similar technical background and channel type (for example, a cellular communication system, such as long term evolution (LTE), LTE-advanced (LTE-A), new radio (NR), wireless broadband (WiBro), global system for mobile communication (GSM), etc., or a short-distance communication system, such as Bluetooth and/or near-field communication (NFC), may be applicable with slight modifications within a range that does not significantly depart from the scope of the inventive concepts.

In addition, various functions to be described below may be implemented or supported by artificial intelligence technology or one or more computer programs, and the one or more computer programs may each be configured by computer-readable program code and executed in a computer-readable medium. The terms "application" and "program" refer to one or more computer programs, software components, sets of instructions, procedures, functions, objects, classes, instances, related data, or portions thereof suitable for implementation of suitable computer-readable program code. The term "computer-readable program code" includes computer code of any type, including source code, object code, and executable code. The term "computer-readable medium" includes any tangible medium that may be accessed by a computer, such as read only memory (ROM), random access memory (RAM), a hard disk drive, a compact disk (CD), a digital video disk (DVD), or any other type of memory. A "non-transitory" computer-readable medium excludes wired, wireless, optical, or other communication links that transmit transitory electrical or other signals. A non-transitory computer-readable medium includes a medium in which data may be permanently stored, and a medium in which data may be stored and later overwritten, such as a rewritable optical disk or a removable memory device.

In embodiments to be described below, a hardware approach method is described as an example. However, because embodiments include technology using both hardware and software, embodiments do not exclude a software-based approach method.

Referring to FIG. 1, the wireless communication system 10 may include first to sixth devices D1_1, D1_2, D2_1, D2_2, D2_3, and D2_4. The first and second devices D1_1, D1_2 may access a network 13 including the Internet, an Internet protocol (IP) network, or any other network. The first device D1_1 may access the network 13 within a first coverage area 11. The first device D1_1 may provide a connection to the network 13 to the third to sixth devices D2_1, D2_2, D2_3, and D2_4 within the first coverage area 11, and the second device D1_2 may provide a connection to the network 13 to the third and fourth devices D2_1 and D2_2 within a second coverage area 12.

In embodiments, the first and second devices D1_1 and D1_2 may communicate with at least one of the third to sixth devices D2_1, D2_2, D2_3, and D2_4 based on wireless fidelity (Wi-Fi) or any other WLAN access technology by using a multi-link. The first and second devices D1_1 and D1_2 may each correspond to an access point multiple links device (AP MLD), and the third to sixth devices D2_1, D2_2, D2_3, and D2_4 may each correspond to a non-access point multiple links device (non-AP MLD). Herein, an AP MLD is a device capable of supporting a plurality of access point (APs), and the non-AP MLD may be a device capable of supporting a plurality of stations (STAs).

In embodiments, the first and second devices D1_1 and D1_2 may be referred to as routers, gateways, or the like, and the third to sixth devices D2_1, D2_2, D2_3, and D2_4 may be referred to as terminals, mobile terminals, wireless terminals, user equipment, or the like. In addition, the third to sixth devices D2_1, D2_2, D2_3, and D2_4 may be mobile devices, such as a mobile phone, a laptop computer, a wearable device, or the like, or may be stationary devices, such as a desktop computer, a smart television (TV), or the like.

The AP MLD may allocate at least one resource unit (RU) to at least one non-AP MLD. The AP MLD may transmit data to the non-AP MLD through the at least one allocated RU, and the non-AP MLD may receive the data through the at least one allocated RU. In 802.11be (hereinafter, referred to as EHT) or next-generation IEEE 802.11 standards (hereinafter, referred to as EHT+), the AP MLD may allocate a multi-resource unit (MRU) including two or more RUs to at least one non-AP MLD. For example, the first device D1_1 may allocate at least one MRU to at least one of the third to sixth devices D2_1, D2_2, D2_3, and D2_4, and may transmit data to the at least one of the third to sixth devices D2_1, D2_2, D2_3, and D2_4 through the at least one allocated MRU.

In embodiments, when an AP MLD and a non-AP MLD perform communication through multiple links, a protection mechanism for ensuring or improving reliability of data communication may be selectively activated for each link. For example, in communication between the AP MLD and the non-AP MLD, the protection mechanism may be activated in communication through a first link, and the protection mechanism may be deactivated in communication through a second link. The AP MLD may adaptively control at least one of a transmission timing of a particular frame (e.g., an RTS frame) and/or content of the particular frame, so that signaling defined in the protection mechanism may be effectively performed with the non-AP MLD. In embodiments, the non-AP MLD may also adaptively control at least one of the transmission timing of a particular frame (e.g., an RTS frame) and/or the content of the particular frame, so that signaling defined in the protection mechanism may be performed with the AP MLD. Hereinafter, for convenience of description, embodiments are mainly described based on an operation of an AP MLD. However, this is only an example, and the inventive concepts are not limited thereto. Embodiments of the inventive concepts may also be applied to a non-AP MLD.

Hereinafter, for convenience of description, embodiments are mainly described based on an operation of an AP MLD. However, this is only an example, and the inventive concepts are not limited thereto. Embodiments may also sufficiently be applied to a non-AP MLD.

In addition, hereinafter, embodiments will be described with reference mainly to EHT. However, it may be understood that embodiments may also be applied to other protocol standards, such as EHT+.

Figure 2:
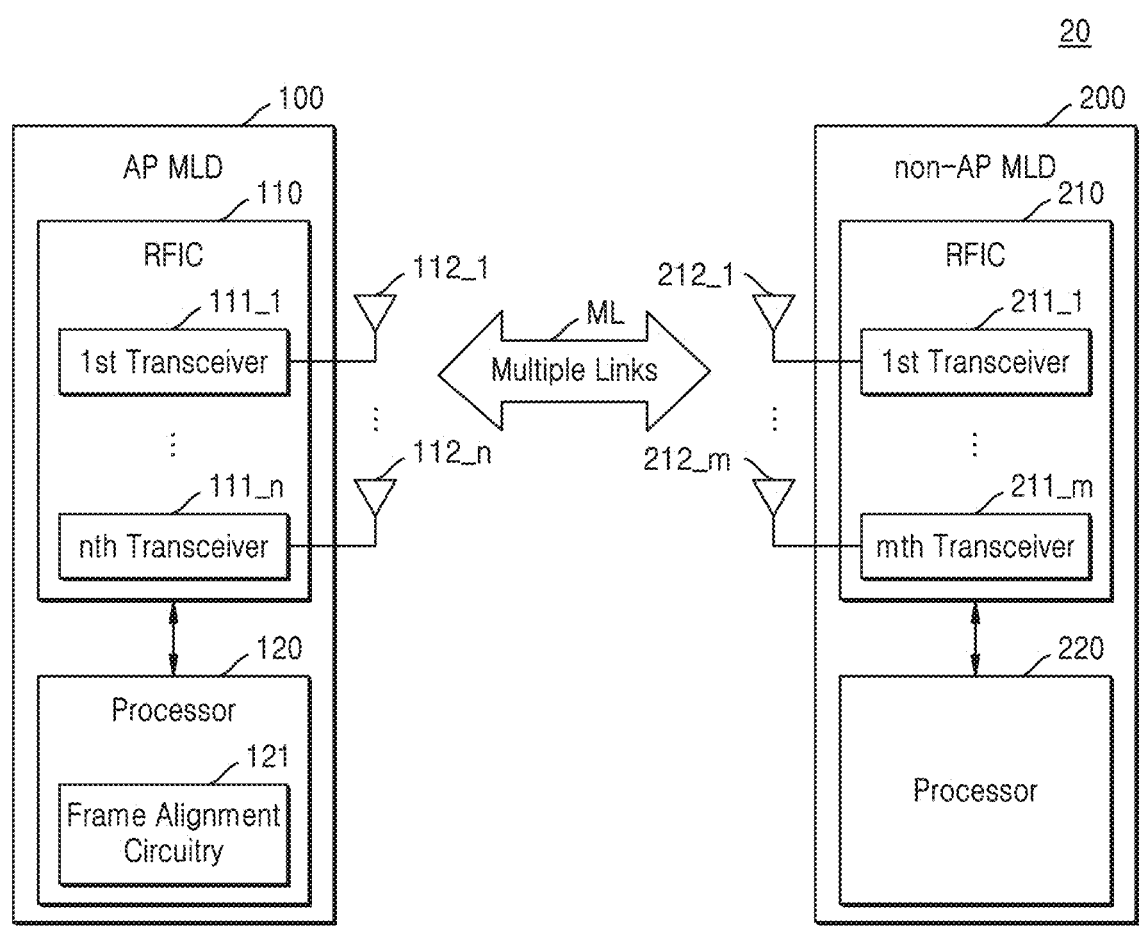
FIG. 2 is a block diagram of a wireless communication system according to embodiments.

FIG. 2 is a block diagram of a wireless communication system 20 according to embodiments of the inventive concepts. In particular, the block diagram of FIG. 2 shows an AP MLD 100 and a non-AP MLD 200, which communicate with each other in the wireless communication system 20. Each of the AP MLD 100 and the non-AP MLD 200 of FIG. 2 may be any device communicating in the wireless communication system 20 and may be referred to as a device for wireless communication or simply a device.

Referring to FIG. 2, the AP MLD 100 may include a radio frequency integrated circuit (RFIC) 110 and/or a processor 120. The RFIC 110 may include first to n-th (where n is an integer greater than or equal to 2) transceivers 111_1 to 111_n and first to n-th antennas 112_1 to 112_n. The RFIC 110 and the processor 120 may be included in one package, or may be included in different packages, respectively. The non-AP MLD 200 may include an RFIC 210 and/or a processor 220. The RFIC 210 may include first to m-th (where m is an integer greater than or equal to 2) transceivers 211_1 to 211_m and first to m-th antennas 212_1 to 212_m. Hereinafter, descriptions of the non-AP MLD 200 already given with reference to descriptions of corresponding features of the AP MLD 100 are omitted.

The first to n-th antennas 112_1 to 112_n may be respectively coupled to the first to n-th transceivers 111_1 to 111_n, and may receive signals from the non-AP MLD 200 to provide the same to the first to n-th transceivers 111_1 to 111_n, or may transmit signals provided from the first to n-th transceivers 111_1 to 111_n to the non-AP MLD 200. In embodiments, the first to n-th antennas 112_1 to 112_n may include a phased array for beamforming.

The first to n-th transceivers 111_1 to 111_n may process signals received from the non-AP MLD 200 through the first to n-th antennas 112_1 to 112_n, and the processed signals may be provided to the processor 120. In addition, the first to n-th transceivers 111_1 to 111_n may process signals provided by the processor 120, and output the processed signals through the first to n-th antennas 112_1 to 112_n. In embodiments, the first to n-th transceivers 111_1 to 111_n may respectively include analog circuits, such as a low noise amplifier, a mixer, a filter, a power amplifier, an oscillator, or the like. The first to n-th transceivers 111_1 to 111_n may process signals received from the first to n-th antennas 112_1 to 112_n and/or signals received from the processor 120 under the control of the processor 120.

In embodiments, the AP MLD 100 may perform communication based on multiple links ML with the non-AP MLD 200 by using the first to n-th transceivers 111_1 to 111_n and the first to n-th antennas 112_1 to 112_n. Frequency bands, to which the multiple links ML are respectively allocated, may be different, and the AP MLD 100 may support up to n APs through a control operation of the processor 120 by using the first to n-th transceivers 111_1 to 111_n and the first to n-th antennas 112_1 to 112_n. For example, the AP MLD 100 may support a first AP configured by the first transceiver 111_1, which is controlled by the processor 120, and the first antenna 112_1, and may support a second AP configured by a second transceiver 111_2 (among the first to n-th transceivers 111_1 to 111_n), which is controlled by the processor 120, and a second antenna 112_2 (among the first to n-th antennas 112_1 to 112_n).

In embodiments, the AP MLD 100 may further include first individual processors (not shown) respectively corresponding to n APs, and the processor 120 may control the first individual processors (not shown), so that each of the n APs may perform an operation according to embodiments. For example, the AP MLD 100 may support a first AP configured by a first-1 individual processor (not shown), the first transceiver 111_1, and the first antenna 112_1, and may support a second AP configured by a first-2 individual processor (not shown), the second transceiver 111_2, and the second antenna 112_2.

The processor 120 may extract information by demodulating and/or decoding signals received from the non-AP MLD 200 including processing signals received from the first to n-th transceivers 111_1 to 111_n. In addition, signals including information to be transmitted to the non-AP MLD 200 may be generated and provided to the first to n-th transceivers 111_1 to 111_n. For example, the processor 120 may provide signals generated by coding and/or modulating data, to be transmitted to the non-AP MLD 200, to the first to n-th transceivers 111_1 to 111_n. In embodiments, the processor 120 may also include a programmable component, such as a central processing unit (CPU), a digital signal processor (DSP), or the like, a reconfigurable component, such as a field programmable gate array (FPGA), or the like, or a component that provides a fixed function, such as an intellectual property (IP) core. In embodiments, the processor 120 may include or access a memory that stores data and/or a series of instructions.

In embodiments, the non-AP MLD 200 may perform communication based on the multiple links ML with the AP MLD 100 by using the first to m-th transceivers 211_1 to 211_m and the first to m-th antennas 212_1 to 212_m. The non-AP MLD 200 may support up to m STAs through a control operation of the processor 220 by using the first to m-th transceivers 211_1 to 211_m and the first to m-th antennas 212_1 to 212_m. As an example, the non-AP MLD 200 may support a first STA configured by the first transceiver 211_1, which is controlled by the processor 220, and the first antenna 212_1, and may support a second STA configured by a second transceiver 211_2 (among the first to m-th transceivers 211_1 to 211_m), which is controlled by the processor 220, and the second antenna 212_2 (among the first to m-th antennas 212_1 to 212_m). In embodiments, the number of STAs supported by the non-AP MLD 200 may be less than or equal to the number of APs supported by the AP MLD 100, and the number of multiple links ML may correspond to the number of STAs supported by the non-AP MLD 200.

In embodiments, the non-AP MLD 200 may further include second individual processors (not shown) respectively corresponding to m STAs, and the processor 220 may also control the second individual processors (not shown), so that each of the m STAs may perform an operation according to embodiments. For example, the non-AP MLD 200 may support a first STA configured by a second-1 individual processor (not shown), the first transceiver 211_1, and the first antenna 212_1, and may support a second STA (not shown) configured by a second-2 individual processor (not shown), the second transceiver 211_2, and the second antenna 212_2.

In embodiments, the processor 120 may include frame alignment circuitry 121. The frame alignment circuitry 121 may adaptively control at least one of an additional length and/or cross-link-related information of a frame (e.g., a request-to-send frame, a clear-to-send frame, etc.), so that signaling of a protection mechanism performed to ensure or improve reliability of communication using the multiple links ML between the AP MLD 100 and the non-AP MLD 200 may be effectively performed. In particular, the AP MLD 100 and the non-AP MLD 200 may transmit and receive a request-to-send (RTS) frame and a clear-to-send (CTS) frame to/from each other based on a protection mechanism, and may transmit and receive mutual data to/from each other based on a result of the transmission/reception. At this time, the frame alignment circuitry 121 may determine at least one of an additional length and/or cross-link-related information of an RTS frame, generate the RTS frame based on a result of the determination, and then transmit the generated RTS frame to the non-AP MLD 200 through the RFIC 110, so that the AP MLD 100 may receive CTS frames, which are in a mutually aligned state, from at least two of the multiple links ML from the non-AP MLD 200. In addition, in embodiments, the frame alignment circuitry 121 may determine whether to transmit another RTS frame based on a result of the determination. For example, in determining cross-link-related information for another link, when the frame alignment circuitry 121 determines that the other link is in a cross-link relationship with a link that transmits the RTS frame, the frame alignment circuitry 121 may omit transmission of the RTS frame through the other link. As another example, in determining cross-link-related information for another link, when the frame alignment circuitry 121 determines that the other link is not in a cross-link relationship with a corresponding link, the frame alignment circuitry 121 may transmit the RTS frame through the other link. In addition, in embodiments in which only the additional length of the RTS frame is determined, the frame alignment circuitry 121 may transmit the RTS frame through another link. A detailed description of a cross-link relationship is given below.

In embodiments, the processor 220 of the non-AP MLD 200 may also include frame alignment circuitry that performs the same operation as, or a similar operation to, that of the frame alignment circuitry 121 of the AP MLD 100.

Figure 3:
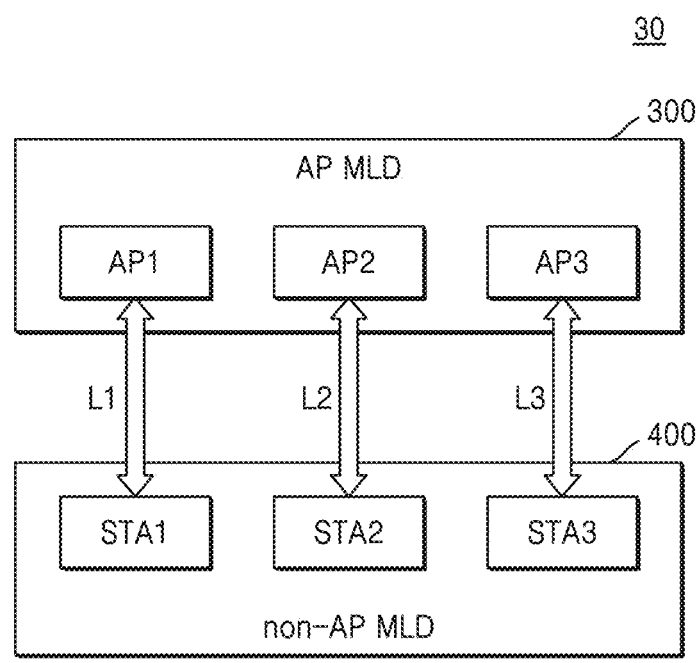
FIG. 3 is a block diagram of a wireless communication system according to embodiments.

FIG. 3 is a block diagram of a wireless communication system 30 according to embodiments of the inventive concepts. In particular, the block diagram of FIG. 3 shows an AP MLD 300 and a non-AP MLD 400, which communicate with each other by using first to third links L1, L2, and L3 in the wireless communication system 30.

In embodiments, the AP MLD 300 may include first to third APs AP1, AP2, and AP3, and the non-AP MLD 400 may include first to third STAs STA1, STA2, and STA3. In embodiments, different from that shown in FIG. 3, the AP MLD 300 and the non-AP MLD 400 may communicate with each other by using two or more links, and may respectively include APs and STAs in a number corresponding to the number of links.

The first to third APs AP1, AP2, and AP3 and the first to third STAs STA1, STA2, STA3 may set up the first to third links L1, L2, and L3, respectively. For example, the AP MLD 300 and the non-AP MLD 400 may perform an access procedure and/or a negotiation procedure for a multi-link operation. The non-AP MLD 400 may identify a band usable in communication with the AP MLD 300 and may negotiate with the AP MLD 300 to use two or more links among the links supported by the AP MLD 300 for a multi-link. A method of performing mutual communication using two or more links may be referred to as a multi-link operation (MLO). Due to MLO, the wireless communication system 30 may provide high throughput.

Figure 4A:
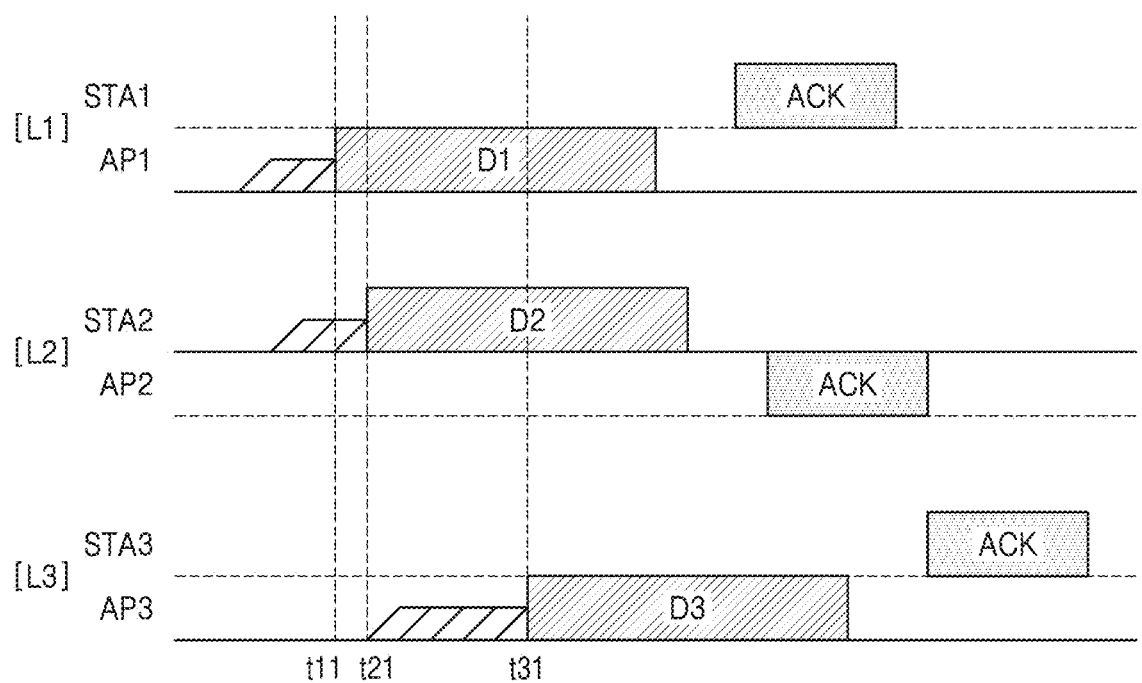
FIGS. 4A and 4B are timing diagrams each illustrating an example of a multi-link operation.
Figure 4B:
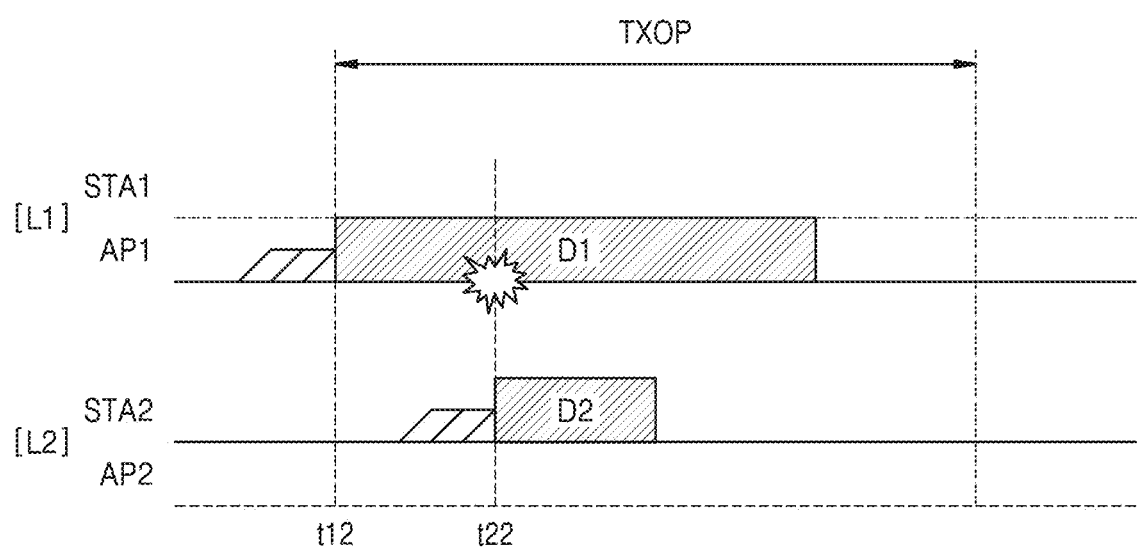

FIGS. 4A and 4B are timing diagrams each illustrating an example of an MLO. In particular, FIGS. 4A and 4B show examples of a multi-link operation performed in the wireless communication system 30 of FIG. 3. Hereinafter, FIGS. 4A and 4B are described with reference to FIG. 3.

The AP MLD 300 and the non-AP MLD 400 of FIG. 3 may support simultaneous (or contemporaneous) transmit and receive (STR). For example, the AP MLD 300 may transmit data to the non-AP MLD 400 over the first link L1, and at the same time (or contemporaneously), receive data from the non-AP MLD 400 over the second link L2. The first to third APs AP1, AP2, and AP3 may respectively have different medium access control (MAC) addresses, and may be in charge (e.g., in control) of the first to third links L1, L2, and L3, respectively. Accordingly, each of the first to third APs AP1, AP2, and AP3 may function as an independent AP. In addition, the first to third STAs STA1, STA2, and STA3 may each have different MAC addresses, and each of the first to third STAs STA1, STA2, and STA3 may function as an independent STA. The AP MLD 300 and the non-AP MLD 400 may communicate with each other in a multi-band. For example, the first link L1 may use a bandwidth (e.g., 40 MHz) in a 2.4 GHz band, the second link L2 may use a bandwidth (e.g., 160 MHz) in a 5 GHz band, and the third link L3 may use a bandwidth (e.g., MHz) in a 6 GHz band.

Referring to FIG. 4A, at time t11, the first AP AP1 may initiate transmission of first data D1 over the first link L1, and the first STA STA1 may receive the first data DE While the first AP AP1 transmits the first data D1, at time t21, the second STA STA2 may initiate transmission of second data D2 over the second link L2, and the second AP AP2 may receive the second data D2. Although the transmission of the first data D1 and the transmission of the second data D2 overlap in the time domain, due to the STR, the first STA STA1 and the second AP AP2 may respectively receive the first data D1 and the second data D2. In addition, while the first AP AP1 transmits the first data D1 and the second STA STA2 transmits the second data D2, at time t31, the third AP AP3 may initiate transmission of third data D3 over the third link L3, and the third STA STA3 may receive the third data D3. Although the transmission of the first data D1, the transmission of the second data D2, and the transmission of the third data D3 overlap in the time domain, due to the STR, the first STA STA1, the second AP AP2, and the third STA STA3 may receive the first data D1, the second data D2, and the third data D3, respectively.

It may be difficult to implement STR on links in a multiple links operation. For example, when frequency bands of links are insufficiently spaced apart, interference may occur between the links, and accordingly, the links may have difficulty in performing STR. In addition, when there is interference between links due to various causes including structural limitations due to lightness, compactness, and/or miniaturization of hardware in a non-AP MLD, the links may have difficulty in performing STR. As described above, links of a multi-link operation may include a non-STR link group including links over which performance of STR may be difficult. In particular, two links having difficulty in performing STR due to mutual interference in a non-STR link group may be referred to as a non-STR link pair. The non-STR link group may be identified while the AP MLD 300 and the non-AP MLD 400 set up the first to third links L1, L2, and L3.

Referring to FIG. 4B, it is assumed that the first link L1 and the second link L2 are a non-STR link pair. For example, the first link L1 may use a band of 6 GHz, and the second link L2 may use a band of 5 GHz. At time 12, the first AP AP1 may obtain a transmit opportunity TXOP and initiate transmission of the first data D1 over the first link L1, and the first STA STA1 may receive the first data D1. At time t22, the second STA STA2 may initiate transmission of the second data D2 over the second link L2, but when the first link L1 and the second link L2 are a non-STR link pair, interference between the transmission of the second data D2 and the reception of the first data D1 on a side of the non-AP MLD 400 may occur. For example, the first data D1 may leak through a path over which the second data D2 is transmitted from the second STA STA2, so that the second data D2 may not be properly transmitted through the second link L2. Such interference may also occur in signaling of a protection mechanism between the AP MLD 300 and the non-AP MLD 400, as described below with reference to FIG. 5. It is assumed that the first link L1 and the second link L2 to be described in the drawings below are a non STR link pair.

Figure 5:
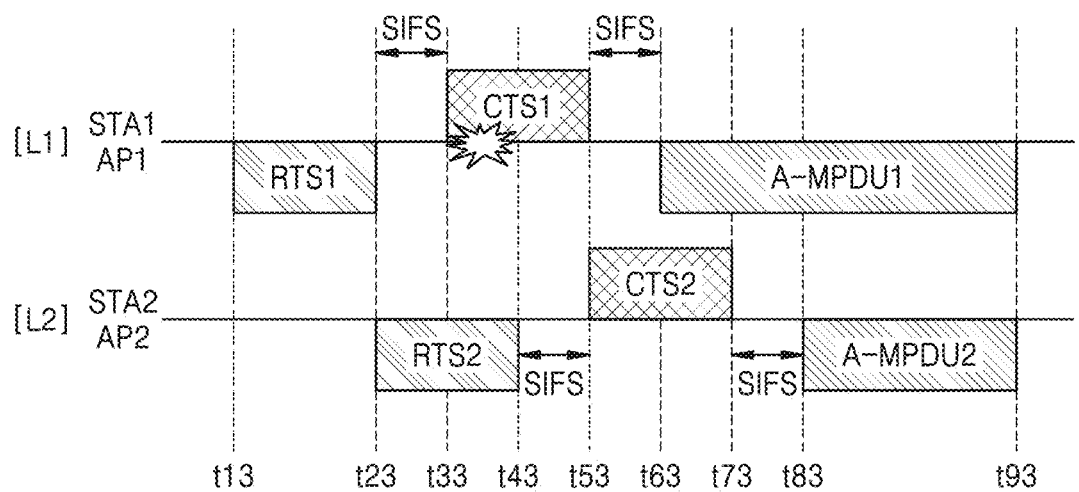
FIG. 5 is a timing diagram including signaling based on a protection mechanism in a multi-link operation.

FIG. 5 is a timing diagram including signaling based on a protection mechanism in a multi-link operation. In particular, FIG. 5 shows an example of a multi-link operation performed in the wireless communication system 30 of FIG. 3. Hereinafter, FIG. 5 is described with reference to FIG. 3. It is assumed that the protection mechanism is activated in the first link L1 and the second link L2.

Referring to FIG. 5, at time 13, the first AP AP1 may initiate transmission of a first RTS frame RTS1 over the first link L1, and the first STA STA1 may receive the first RTS frame RTS1. At time t33 after a short interframe space SIFS from time t23, the first STA STA1 may initiate transmission of a first CTS frame CTS1 over the first link L1 in response to the first RTS frame RTS1, and the first AP AP1 may receive the first CTS frame CTS1. At time t63 after the short interframe space SIFS from time t53, the first AP AP1 may initiate transmission of a first aggregated-MAC protocol data unit (A-MPDU) A-MPDU1 over the first link L1 in response to the first CTS frame CTS1, and the first STA STA1 may receive the first A-MPDU A-MPDU1.

At time t23, the second AP AP2 may initiate transmission of a second RTS frame RTS2 over the second link L2, and the second STA STA2 may receive the second RTS frame RTS2. At time t53 after the short interframe space SIFS from time t43, the second STA STA2 may initiate transmission of a second CTS frame CTS2 over the second link L2 in response to the second RTS frame, and the second AP AP2 may receive the second CTS frame CTS2. At time t83 after the short interframe space SIFS from time t73, the second AP AP2 may initiate transmission of a second A-MPDU A-MPDU2 over the second link L2 in response to the second CTS frame CTS2, and the second STA STA2 may receive the second A-MPDU A-MPDU2. The AP MLD 300 may control an end of the first A-MPDU A-MPDU1 to be aligned with an end of the second A-MPDU A-MPDU2 at time t93.

From time t33 to time t43, because the first link L1 and the second link L2 are a non-STR link pair, interference between the transmission of the first CTS frame CTS1 and the reception of the second RTS frame RTS2 may occur on a side of the non-AP MLD 400. Due to the above interference, signaling of a smooth protection mechanism may be difficult, which may adversely affect the reliability of data communication.

The AP MLD 300 according to embodiments may determine at least one of an additional length and/or cross-link-related information of the first RTS frame RTS1 to avoid interference between the reception of the second RTS frame RTS2 and the transmission of the first CTS frame CTS1 in the non-AP MLD 400. That is, the AP MLD 300 may generate the first RTS frame RTS1 for aligning the first CTS frame CTS1 with the second CTS frame to transmit the generated first RTS frame RTS1 to the non-AP MLD 400 through the first link L1. In embodiments, for the format of the first RTS frame RTS1, any one of a plurality of trigger formats defined in a standard specification is adopted or newly developed so that padding data or cross-link-related information corresponding to an additional length may be appropriately arranged, and thus, signaling of an efficient protection mechanism may be supported.

A method of generating the first RTS frame RTS1 of the AP MLD 300 may vary, and examples thereof are described with reference to FIGS. 6A to 13C. The format of the first RTS frame RT1 may vary, and examples thereof are described with reference to FIGS. 14A to 18.

Figure 6A:
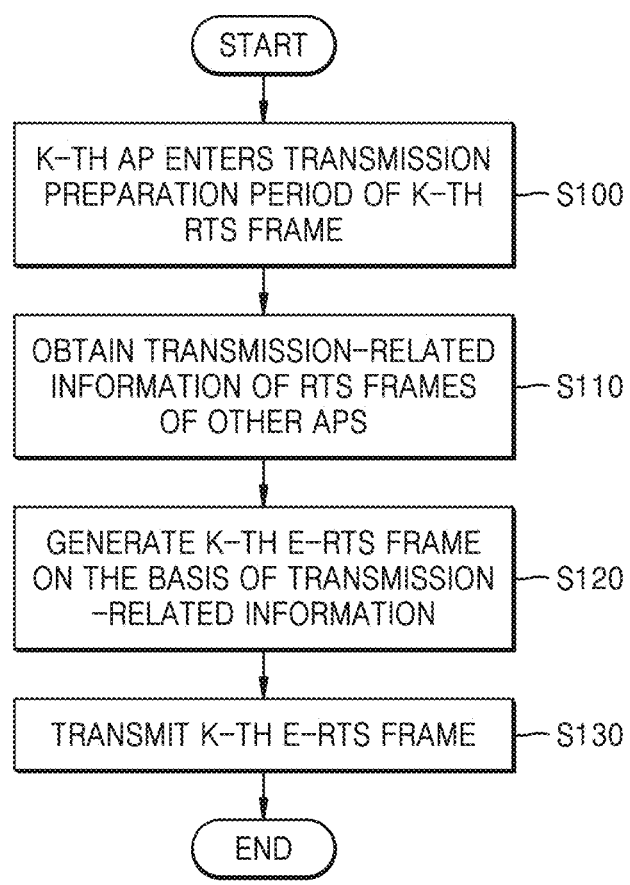
FIGS. 6A and 6B are flowcharts illustrating an operating method of an access point multiple links device (AP MLD), according to embodiments.
Figure 6B:
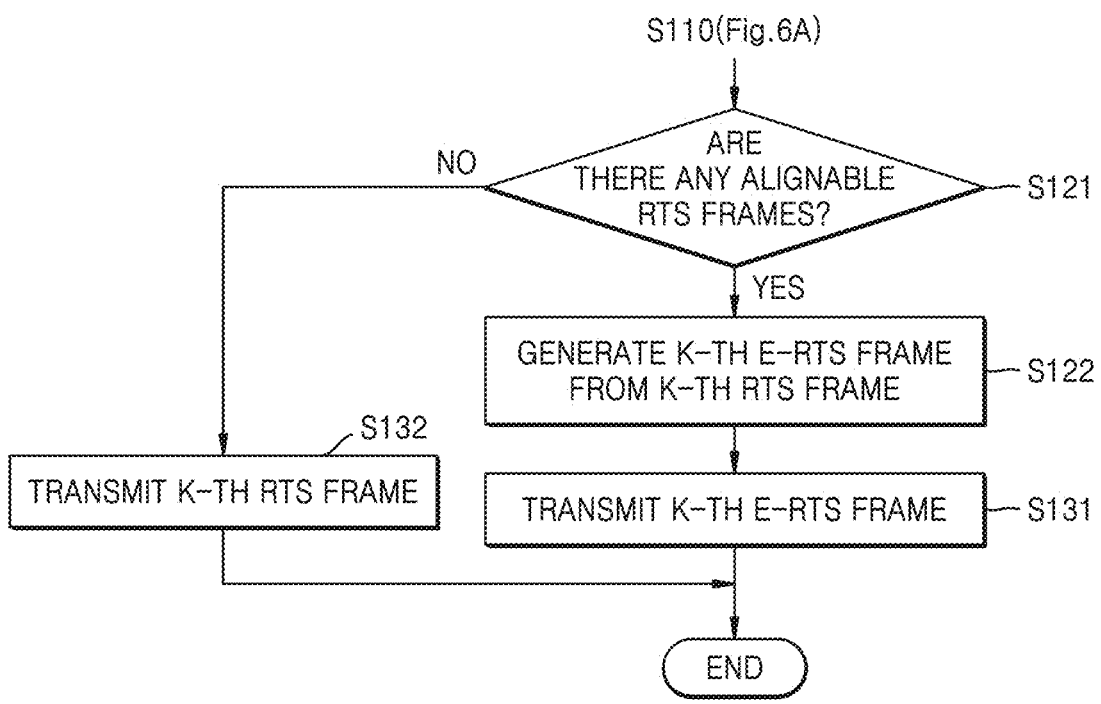

FIGS. 6A and 6B are flowcharts illustrating an operating method of an AP MLD, according to embodiments. It is assumed that a k-th AP and other APs described below are included in the AP MLD. In addition, hereinafter, a case in which an RTS frame is transmitted to a non-AP MLD from an AP MLD is mainly described. However, the inventive concepts are not limited thereto, and the inventive concepts may be applied even when the RTS frame is transmitted from the non-AP MLD to an AP MLD.

Referring to FIG. 6A, in operation S100, the k-th AP may enter a transmission preparation period of a k-th RTS frame. Herein, an operation of a particular AP may be interpreted as an operation of an AL MLD. In addition, herein, a transmission preparation period of an RTS frame is a period that determines at least one of an additional length and/or cross-link-related information of the RTS frame, and may be set before a transmission timing of the RTS frame arrives. However, the transmission preparation period of the RTS frame is arbitrarily named to help understanding of embodiments, and the inventive concepts are not limited thereto. Also, in embodiments, the AP MLD may perform an operation of generating an RTS frame according to another period without a separate transmission preparation period of the RTS frame. For example, the transmission preparation period of an RTS frame may be entered in response to a back-off count for transmission of an RTS frame of a corresponding AP reaching a reference value. For example, when the back-off count of the AP gradually decreases from a certain value to reach the reference value, the AP may enter the transmission preparation period of an RTS frame.

In operation S110, the k-th AP may obtain transmission-related information of RTS frames of APs other than the k-th AP. The other APs may be limited to APs corresponding to links having a non-STR link pair relationship with a k-th link corresponding to the k-th AP. In embodiments, the transmission-related information of RTS frames of the other APs may include whether (e.g., an indication of whether) a protection mechanism is activated in links corresponding to the other APs and back-off counts of the other APs for transmission of the RTS frame. In the transmission preparation period of the k-th RTS frame, the k-th AP may identify in advance other APs capable of transmitting RTS frames and an RTS frame having a transmission timing close to a transmission timing of the k-th RTS frame through the transmission-related information of RTS frames.

In operation S120, the k-AP may generate a k-th extended (E)-RTS frame based on the transmission-related information obtained in operation S110. In embodiments, the k-th AP may determine an additional length of the k-th RTS frame based on a transmission timing of an RTS frame of the other AP, and add padding data corresponding to the additional length to the k-th RTS frame to generate the k-th E-RTS frame.

In operation S130, the k-th AP may end the transmission preparation period and transmit the k-th E-RTS frame. Thereafter, the other AP may transmit an RTS frame, and an end of the k-th E-RTS frame transmitted from the k-th AP may be aligned with an end of the RTS frame transmitted from the other AP.

FIG. 6B is a flowchart particularly illustrating operation S120 and operation S130 of FIG. 6A. Referring to FIG. 6B, in operation S121 after operation S110 (FIG. 6A), the $k^{th}$ AP may identify whether there is an RTS frame that may be aligned with the $k^{th}$ RTS frame. At this time, the RTS frame that may be aligned with the k-th RTS frame may refer to an RTS frame scheduled to be transmitted to have an end that may be aligned with an end of the k-th RTS frame.

When the result of operation S121 is 'YES', operation S122 may be subsequently performed, and the k-th AP may generate the k-th E-RTS frame from the k-th RTS frame. In particular, the k-th AP may determine an additional length based on a difference between a transmission timing of an alignment target RTS frame of an identified AP and a transmission timing of the k-RTS frame of the k-th AP, and generate padding data corresponding to the additional length to add the generated padding data to the k-th RTS frame, thereby generating the k-th E-RTS frame. In embodiments, in operation S121, it may be identified that there are a plurality of RTS frames that may be aligned with the $k^{th}$ RTS frame, and in this case, APs including the $k^{th}$ AP may generate the k-th-ETS frame and alignment target E-RTS frames by adding padding data to each of the k-RTS frame and the alignment target RTS frames.

In operation S131, the k-th AP may transmit the k-th E-RTS frame. The k-th E-RTS frame may be longer than an alignment target RTS frame.

When the result of operation S121 is 'NO', operation S132 may be subsequently performed, and the AP MLD may transmit the k-th RTS frame to the non-AP MLD. The k-th RTS frame may have the same length as (or a similar length to) that of an alignment target RTS frame. According to embodiments, when the result of operation S121 is 'NO', operation S132 is performed without performing operation S122.

FIG. 7 is a timing diagram illustrating an example of a multiple links operation, according to embodiments.

Referring to FIG. 7, a back-off count of the first AP AP1 corresponding to the first link L1 may decrease while the first link L1 is not in a busy state, and a back-off count of the second AP AP2 corresponding to the second link L2 may decrease while the second link L2 is not in a busy state. At time t14, the first link L1 may enter a busy state due to other transmissions, and the back-off count of the first AP AP1 may stop decreasing. Similarly, at time t24, the second link L2 may enter a busy state due to other transmissions, and the back-off count of the second AP AP2 may stop decreasing.

At time t34, the busy state of the first link L1 may be released, and accordingly, the back-off count of the first AP AP1 may gradually decrease from 4 (e.g., may resume from the back-off count prior to the busy state). In embodiments, the release of the busy state may be referred to as a ready state (or an idle state). Similarly, at time t44, the busy state of the second link L2 may be released, and accordingly, the back-off count of the second AP AP2 may gradually decrease from 3 (e.g., may resume from the back-off count prior to the busy state). In addition, at time t44, the first AP AP1 may enter a transmission preparation period TPP of the first RTS frame RTS1 in response to the back-off count of the first AP AP1 reaching 1. However, this is an example, and the inventive concepts are not limited thereto. The first AP AP1 may enter the transmission preparation period TPP of the first RTS frame RTS1 in response to that the back-off count of the first AP AP1 reaches another reference value (e.g., a threshold reference value).

In the transmission preparation period TPP, the first AP AP1 may obtain transmission-related information of the second RTS frame of the second AP AP2. In particular, the first AP AP1 may obtain the back-off count of the second AP AP2 (e.g., the back-off count of the second link L2). At this time, at time t44, the first AP AP1 may identify that a difference between the transmission timing (e.g., back-off count, which is 1) of the first AP AP1, and the transmission timing (e.g., back-off count, which is 3) of the second AP AP2, falls within a reference difference to determine the second RTS frame as an alignment target RTS frame. In the transmission preparation period TPP, at time t44, the first AP AP1 may determine an additional length for the first RTS frame based on the difference between the transmission timing (e.g., back-off count, which is 1) of the first AP AP1, and the transmission timing (e.g., back-off count, which is 3) of the second AP AP2, and add padding data corresponding to the additional length (e.g., 2) to generate a first E-RTS frame E-RTS1. In embodiments, a unit length of padding data may correspond to a unit length of a back-off count.

At time t54, as the back-off count of the first AP AP1 reaches 0, the first AP AP1 may end the transmission preparation period TPP to transmit the first E-RTS frame E-RTS1 to the first STA STA1 through the first link L1.

At time t64, as the back-off count of the second AP AP2 reaches 0, the second AP AP2 may transmit the second RTS frame RTS2 to the second STA STA2 through the second link L2. Although a transmission timing of the first E-RTS frame E-RTS1 is different from a transmission timing of the second frame RTS2, an end (of transmission timing) of the first E-RTS frame E-RTS1 may be aligned with an end (of transmission timing) of the second RTS frame RTS2. According to embodiments, a length of the first E-RTS frame E-RTS1 is greater than a length of the second RTS frame RTS2.

When the first STA STA1 identifies that the first link L1 is in a ready state by sensing the first link L1, at time t84 after the short interframe space SIFS from time t74, the first STA STA1 may transmit the first CTS frame CTS1 to the first AP AP1 through the first link L1. When the second STA STA2 identifies that the second link L2 is in a ready state by sensing the second link L2, at time t84 after the short interframe space SIFS from time t74, the second STA STA2 may transmit the second CTS frame CTS2 to the second AP AP2 through the second link L2. Accordingly, the first CTS frame CTS1 and the second CTS frame CTS2 may be aligned with each other. In embodiments, a sensing operation for the first link L1 of the first STA STA1 and a sensing operation for the second link L2 of the second STA STA2 may be performed from time t74 to time t84. Herein, a sensing operation for a link may be referred to as a link sensing operation.

At time t104 after the short interframe space SIFS from time t94, the first AP AP1 may transmit a first A-MPDU A-MPDU1 to the first STA STA1 through the first link L1, and the second AP AP2 may transmit a second A-MPDU A-MPDU2 to the second STA STA2 through the second link L2.

Figure 8A:
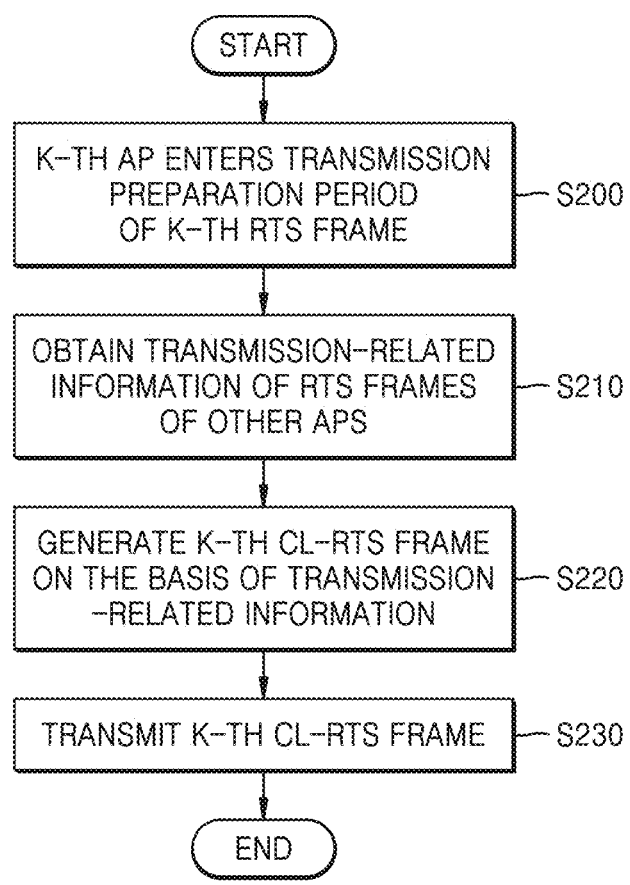
FIGS. 8A and 8B are flowcharts illustrating an operating method of an AP MLD, according to embodiments.
Figure 8B:
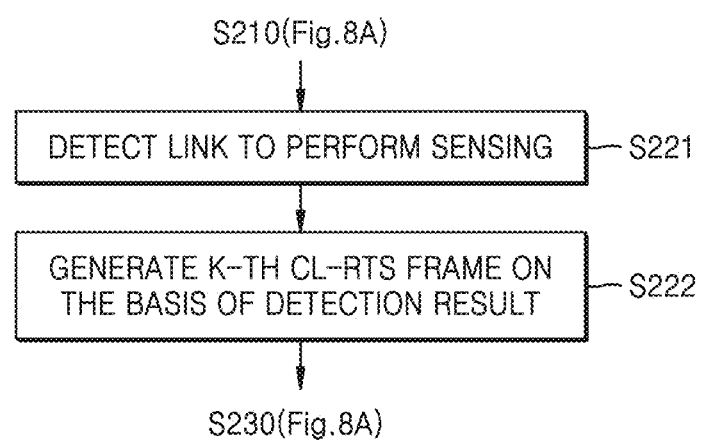

FIGS. 8A and 8B are flowcharts illustrating an operating method of an AP MLD, according to embodiments. Hereinafter, a case in which an RTS frame is transmitted to a non-AP MLD from an AP MLD is mainly described. However, the inventive concepts are not limited thereto, and the inventive concepts may be applied even when the RTS frame is transmitted from the non-AP MLD to an AP MLD. In addition, hereinafter, descriptions already given with reference to FIGS. 6A and 6B are omitted.

Referring to FIG. 8A, in operation S200, a k-AP may enter a transmission preparation period of a k-RTS frame.

In operation S210, the k-th AP may obtain transmission-related information of RTS frames of APs other than the k-th AP. The other APs may be limited to APs corresponding to links having a non-STR link pair relationship with a k-th link corresponding to the k-th AP.

In operation S220, the k-th AP may generate a k-th cross-link (CL)-RTS frame based on the transmission-related information obtained in operation S210. In embodiments, the k-th AP may determine cross-link-related information of the kth RTS frame based on a transmission timing of an RTS frame of another AP and fill the k-th RTS frame with data corresponding to the determined cross-link-related information, thereby generating the k-th CL-RTS frame. In embodiments, the cross-link-related information may include at least one of a link index indicating multiple links (e.g., indicating or identifying the first link L1, the second link L2, etc.), information indicating whether sensing of each of the multiple links is to be performed (e.g., whether sensing of the first link L1, the second link L2, etc., is to be performed, or is required), and/or resource information (e.g., RUs, such as frequency and/or timing resources) allocated to the multiple links (e.g., allocated to the first link L1, the second link L2, etc.) for transmission of CTS frames. In embodiments, the cross-link-related information may further include information indicating whether transmission of a CTS frame is possible through an alternative link with respect to each of the multiple links (e.g., with respect to the first link L1, the second link L2, etc.).

In embodiments, the format of the k-th RTS frame may include a plurality of fields corresponding to cross-link-related information, and the plurality of fields may include a first field indicating multiple links (e.g., indicating or identifying the first link L1, the second link L2, etc.), a second field indicating whether link sensing for multiple links is to be performed (e.g., whether sensing of the first link L1, the second link L2, etc., is to be performed, or is required), and/or a third field indicating resources (e.g., RUs, such as frequency and/or timing resources) allocated to the multiple links (e.g., the first link L1, the second link L2, etc.) for transmission of CTS frames. In embodiments, the format of the kth RTS frame may further include at least one of a fourth field indicating whether transmission of a CTS frame is possible through an alternative link with respect to each of the multiple links (e.g., with respect to the first link L1, the second link L2, etc.) and/or a padding field filled with padding data having a variable length according to an additional length.

In embodiments, the format of the k-th RTS may include a plurality of individual fields corresponding to cross-link-related information, and each of the plurality of individual fields may include a first subfield indicating a specific link (e.g., indicating or identifying one of the first link L1, the second link L2, etc.), a second subfield indicating whether link sensing is to be performed for the specific link (e.g., whether sensing of one of the first link L1, the second link L2, etc., is to be performed, or is required), and/or a third subfield indicating resources (e.g., RUs, such as frequency and/or timing resources) allocated to the specific link (e.g., one of the first link L1, the second link L2, etc.) for transmission of a CTS frame. In embodiments, each of the plurality of individual fields included in the format of the k-th RTS frame may further include a fourth subfield indicating whether transmission of a CTS frame is possible through an alternative link with respect to a specific link (e.g., with respect to one of the first link L1, the second link L2, etc.). In addition, in embodiments, the format of the k-th RTS frame may further include a padding field filled with padding data having a variable length according to an additional length described above with reference to FIGS. 6A to 7.

In embodiments, the format of the k-th RTS frame may correspond to any one of a plurality of trigger frame types proposed in the IEEE 802.11ax standard. At this time, the format of the k-th RTS frame may include a common information field and/or a user information field, and cross-link-related information may be arranged in any one of the common information field and/or the user information field.

In operation S230, the k-th AP may end the transmission preparation period and transmit a k-th CL-RTS frame to a k-th STA. The transmission of the k-th CL-RTS frame may replace transmission of an RTS frame of another AP, and accordingly, the transmission of an RTS frame of the other AP to other STA may be omitted.

FIG. 8B is a flowchart particularly illustrating operation S220 of FIG. 8A. Referring further to FIG. 8B, in operation S221 after operation S210 (FIG. 8A), the k-th AP may detect a link for which sensing is to be performed (e.g., is required) among (other) links other than a k-th link corresponding to the k-th AP. The detected link may be referred to as being in a cross-link relationship with the k-th link. Herein, sensing for a link may refer to an operation of sensing whether a state of the link is a busy state. In embodiments, the k-th AP may detect a link in which transmission of an RTS frame having a transmission timing close to a transmission timing of the k-th RTS frame is scheduled.

In operation S222, the k-th AP may generate the k-th CL-RTS frame based on a detection result in operation S221. For example, based on information indicating that link sensing is to be performed for a link index corresponding to the detected link, resource information allocated to the k-th link for transmission of a CTS frame may be filled in the k-th RTS frame to generate the k-th CL-RTS frame. Then, operation S230 (FIG. 8A) may follow.

FIG. 9 is a table diagram for explaining cross-link-related information INFO1, according to embodiments.

Referring to FIG. 9, the cross-link-related information INFO1 may include 'Link Index' information indicating each of multiple links, 'Link Sensing Required' information indicating whether sensing of each of multiple links is to be performed (e.g., is required), and 'RU Allocation' information indicating resources allocated to multiple links for transmission of CTS frames. The cross-link-related information INFO1 may further include information used for CTS frame transmission of an AP (e.g., the AP detected in operation S221 in FIG. 8B) that does not directly receive an RTS frame through a link allocated to itself, and may include a 'Reserved' space in which such information may be arranged.

Figure 10A:
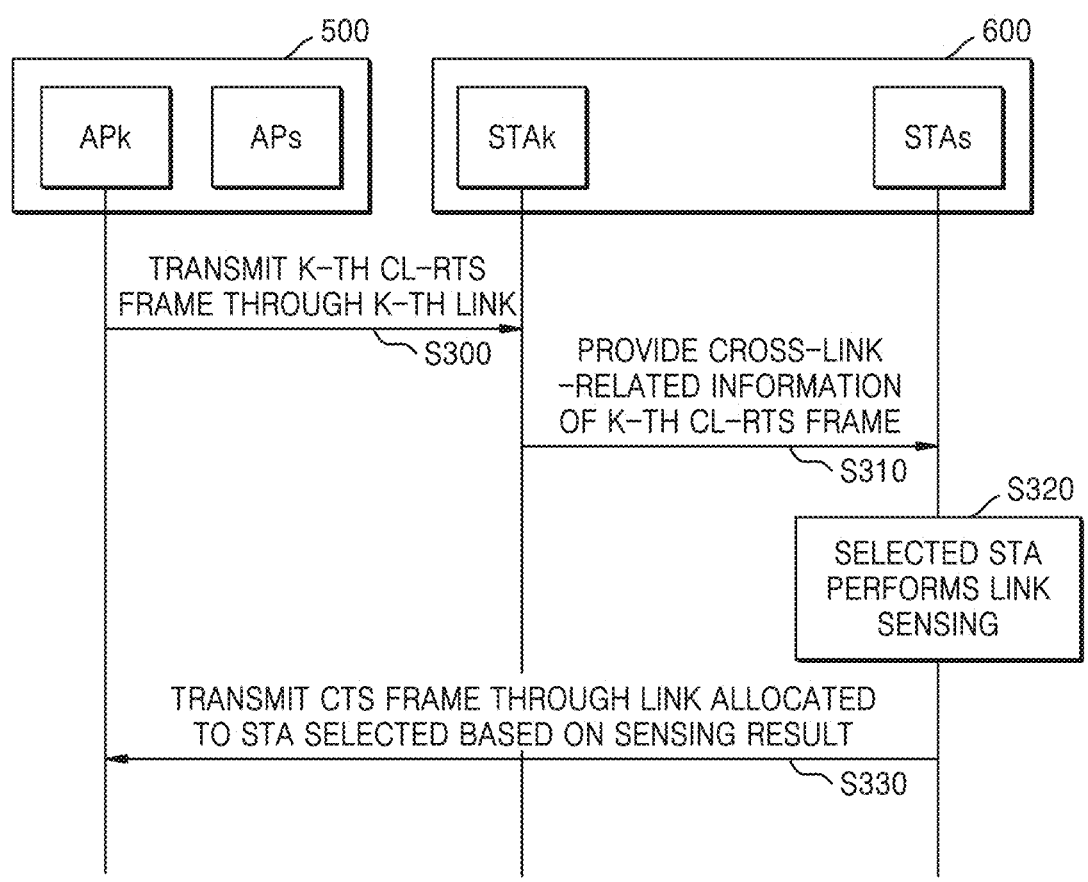
FIGS. 10A and 10B are flowcharts illustrating an operating method of an AP MLD and a non-AP MLD, according to embodiments.
Figure 10B:
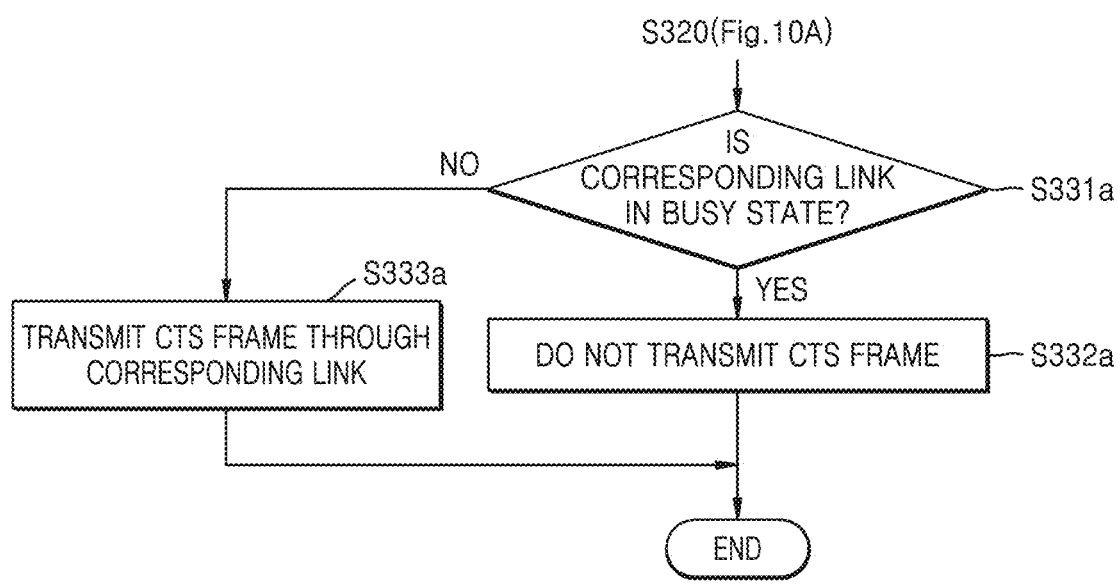

FIGS. 10A and 10B are flowcharts illustrating an operating method of an AP MLD 500 and a non-AP MLD 600, according to embodiments. As shown in FIG. 10A, the AP MLD 500 may include (e.g., support) a k-th AP APk and other APs APs, and the non-AP MLD 600 may include (e.g., support) a k-th STA STAk communicating with the k-th APk through a k-th link and other STAs STAs. Hereinafter, a case in which an RTS frame is transmitted to the non-AP MLD 600 from the AP MLD 500 is mainly described. However, the inventive concepts are not limited thereto, and the inventive concepts may be applied even when the RTS frame is transmitted from the non-AP MLD 600 to the AP MLD 500.

Referring to FIG. 10A, in operation S300, the k-th AP APk may transmit a k-th CL-RTS frame through the k-th link. As described above, the k-th CL-RTS frame may indicate a link for which link sensing is to be performed in response to the k-th CL-RTS frame among other links of the other APs APs, and may indicate resources for transmission of a CTS frame. The AP MLD 500 may omit transmission of an RTS frame through a link having a cross-link relationship with the k-th link. For example, when a second link is sensed based on a CL-RTS frame transmitted through a first link (e.g., in response to the transmission of the CL-RTS frame), the first link and the second link may be referred to as having a mutual cross-link relationship. As the k-th CL-RTS frame is used for sensing a link in a cross-link relationship with the k-th link, transmission of an RTS frame through the corresponding link may be omitted.

In operation S310, the non-AP MLD 600 (e.g., the k-th STA STAk) may provide cross-link-related information of the k-th CL-RTS frame to other STAs STAs.

In operation S320, an STA selected from among the other STAs STAs may perform link sensing based on the cross-link-related information. The selected STA may be an STA corresponding to a link for which sensing is to be performed (as indicated) in the cross-link-related information. Herein, an operation of a particular STA may be interpreted as an operation of a non-AP MLD.

The STA selected in operation S330 may transmit a CTS frame to an AP corresponding to the STA selected from among the other APs APs through a link allocated to the STA selected based on a sensing result in operation S320. Although not shown in FIG. 10A, a k-th STA STAk may sense the k-th link in response to the k-th CL RTS frame, and transmit the k-th CTS frame to the k-th AP APk through the k-th link based on a sensing result.

FIG. 10B is a flowchart particularly illustrating operation S330 of FIG. 10A. Referring further to FIG. 10B, in operation S331a after operation S320 (FIG. 10A), the selected STA may respond to the k-th CL-RTS frame to identify whether a corresponding link, that is, a link allocated to itself, is in a busy state.

When the result of operation S331a is 'YES', operation S332a may be subsequently performed, and the selected STA may not transmit a CTS frame through a corresponding link. When the result of operation S331a is 'NO', operation S333a may be subsequently performed, and the selected STA may transmit a CTS frame through a corresponding link.

FIG. 11 is a table diagram for explaining cross-link-related information INFO2, according to embodiments.

Hereinafter, a difference from the cross-link-related information INFO1 of FIG. 9 is mainly described.

Referring to FIG. 11, as compared with the cross-link-related information INFO1 of FIG. 9, the cross-link-related information INFO2 may further include 'non-Primary TX' information indicating whether a CTS frame may be transmitted through an alternative link with respect to each of multiple links. In particular, the 'non-Primary TX' information may indicate whether to transmit a CTS frame through an alternative link by detecting an alternative link in a ready state among other links for each link when STAs or APs of a device (e.g., an AP MLD or a non-AP MLD) may not transmit a CTS frame through links allocated to themselves because the links allocated to themselves are currently in a busy state.

Figure 12:
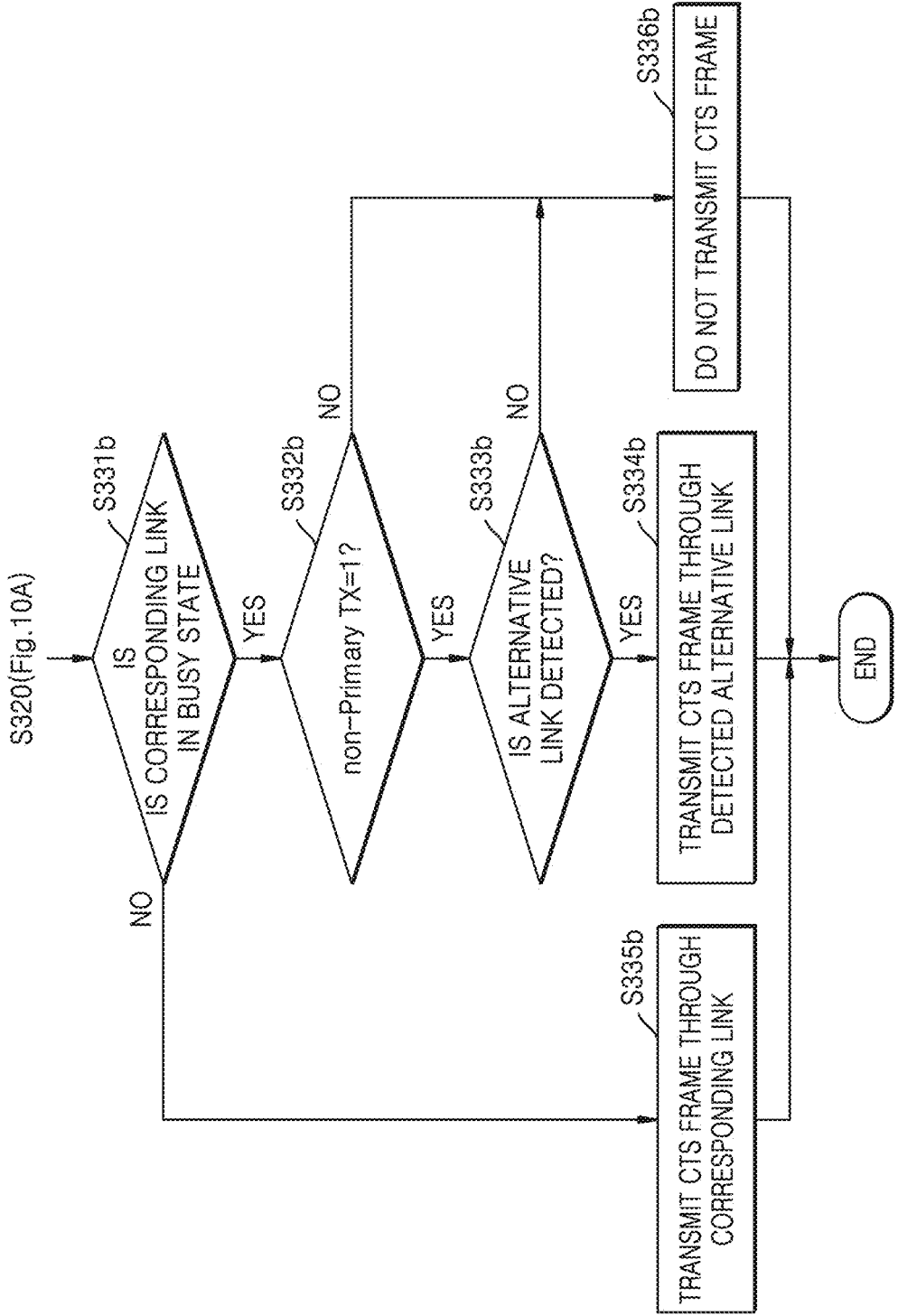
FIG. 12 is a flowchart illustrating an example of operation S330 of FIG. 10A using cross-link-related information of FIG. 11.

FIG. 12 is a flowchart illustrating an example of operation S330 of FIG. 10A using the cross-link-related information INFO2 of FIG. 11.

Referring to FIG. 12, in operation S331b after operation S320 (FIG. 10A), the selected STA, in response to the k-th CL-RTS frame, may identify whether a corresponding link, that is, a link allocated to itself, is in a busy state.

When the result of operation S331b is 'YES', operation S332b may be subsequently performed, and the selected STA may identify whether a value corresponding to the link is '1' with reference to the 'non-Primary TX' information of FIG. 11.

When the result of operation S332b is 'YES', operation S333b may be subsequently performed, and the selected STA may perform a detection operation on an alternative link currently in a ready state among other links, and may identify whether an alternative link is detected.

When the result of operation S333b is 'YES', operation S334b may be subsequently performed, and the selected STA may transmit a CTS frame through a detected alternative link.

When the result of operation S331b is 'NO', operation S335b may be subsequently performed, and the selected STA may transmit a CTS frame through a corresponding link.

When the result of at least one of operation S332b and/or operation S333b is 'NO', operation S336b may be subsequently performed, and the selected STA may not transmit a CTS frame.

Figure 13A:
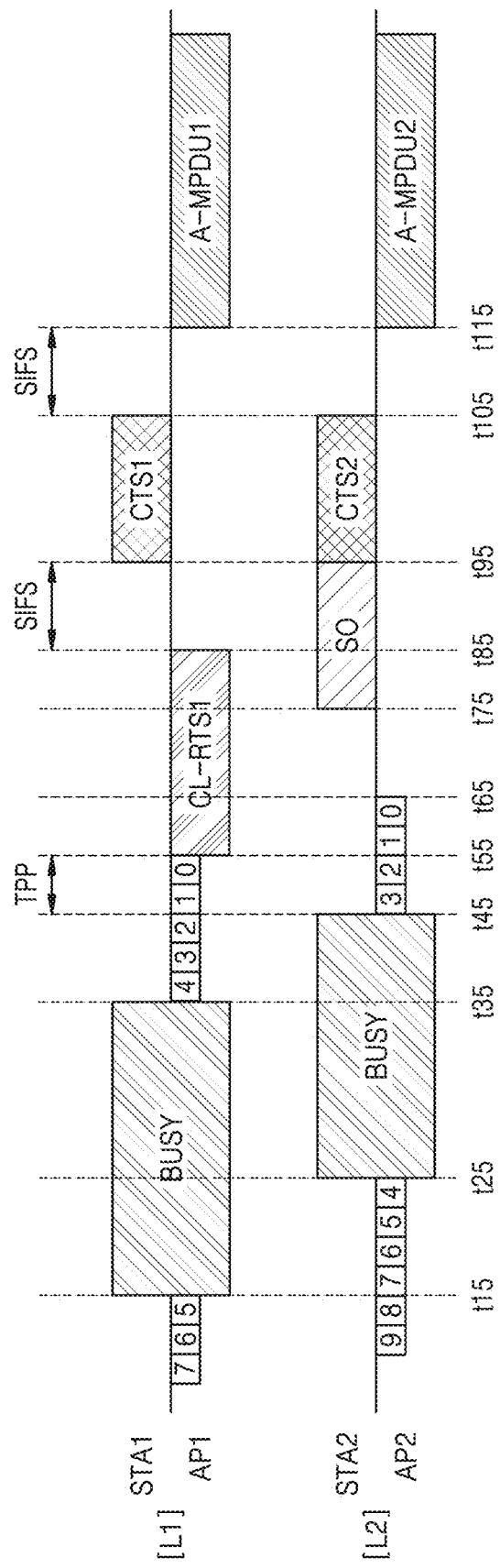
FIGS. 13A to 13C are timing diagrams illustrating examples of a multi-link operation, according to embodiments.
Figure 13B:
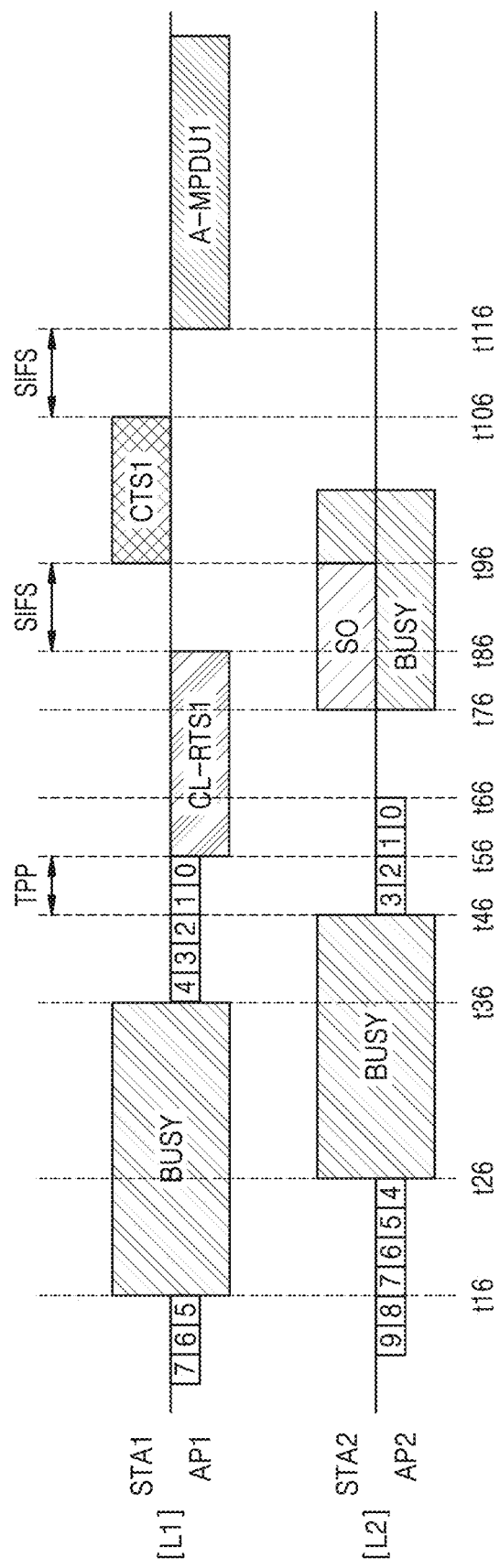
Figure 13C:
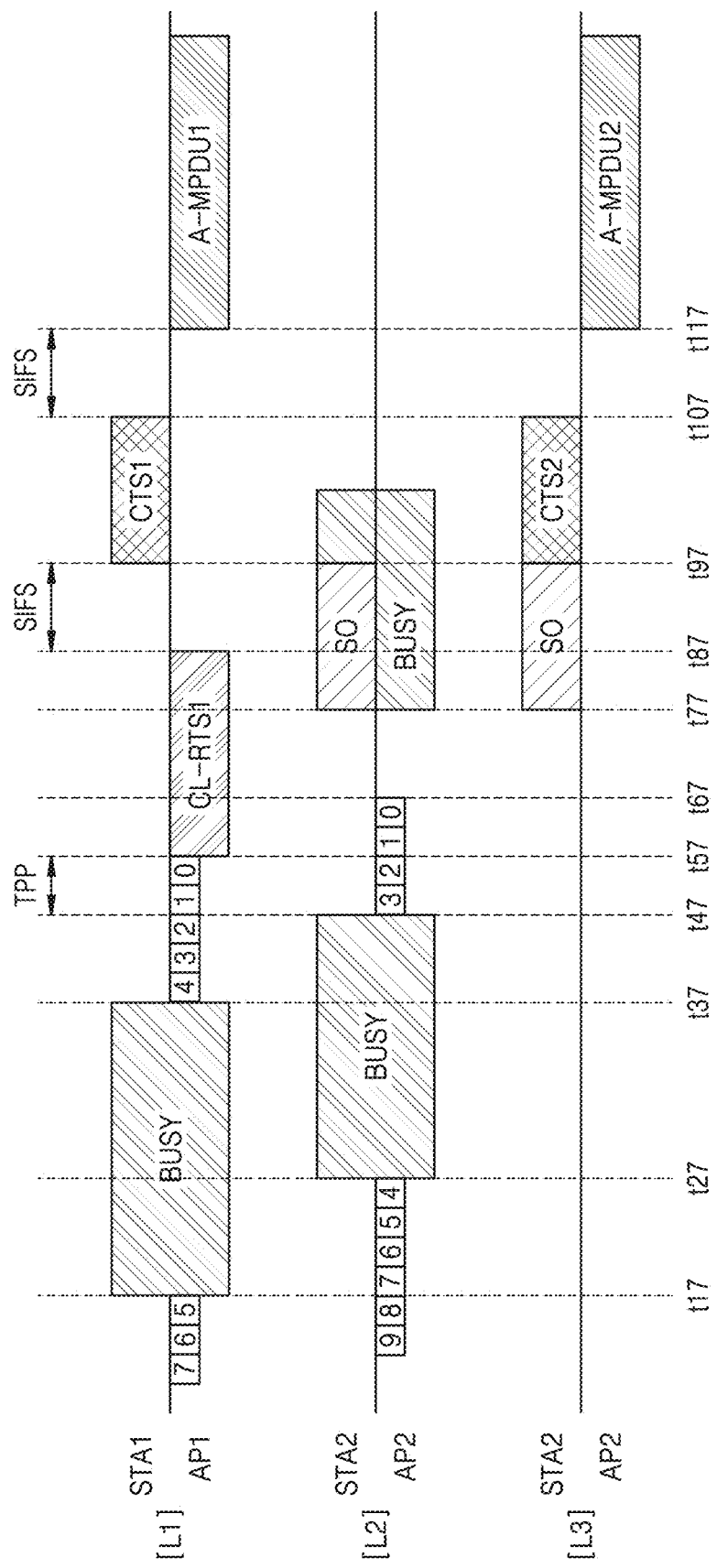

FIGS. 13A to 13C are timing diagrams illustrating examples of a multi-link operation, according to embodiments. Hereinafter, descriptions already given with reference to FIG. 7 are omitted.

Referring to FIG. 13A, at time t15, the first link L1 may enter a busy state due to other transmissions, and a back-off count of the first AP AP1 may stop decreasing. Similarly, at time t25, the second link L2 may enter a busy state due to other transmissions, and a back-off count of the second AP AP2 may stop decreasing.

At time t35, the busy state of the first link L1 may be released, and accordingly, the back-off count of the first AP AP1 may gradually decrease from 4. Similarly, at time t45, the busy state of the second link L2 may be released, and accordingly, the back-off count of the second AP AP2 may gradually decrease from 3. In addition, at time t45, the first AP AP1 may enter a transmission preparation period TPP of a first RTS frame in response to the back-off count of the first AP AP1 reaching 1.

In the transmission preparation period TPP, the first AP AP1 may obtain transmission-related information of a second RTS frame of the second AP AP2. For example, the first AP AP1 may receive the transmission-related information from the second AP AP2. In particular, the first AP AP1 may obtain information indicating that a protection mechanism is activated in the second link L2 corresponding to the second AP AP2 and the back-off count of the second AP AP2. At this time, the first AP AP1 may identify that a difference between the transmission timing (e.g., back-off count, which is 1) of the first AP AP1, and the transmission timing (e.g., back-off count, which is 3) of the second AP AP2, falls within a reference difference to detect that the second link L2 as a link for which sensing is to be performed. In the transmission preparation period TPP, the first AP AP1 may determine cross-link-related information based on a detection result. In particular, the first AP AP1 may determine cross-link-related information to indicate that sensing for the second link L2 is to be performed and to indicate resources allocated for transmission of the second CTS frame CTS2 through the second link L2. In the transmission preparation period TPP, the first AP AP1 may generate the first CL-RTS frame CL-RTS1 by filling the first RTS frame with data corresponding to the determined cross-link-related information.

At time t55, as the back-off count of the first AP AP1 reaches 0, so that the first AP AP1 may end the transmission preparation period TPP to transmit the first CL-RTS frame CL-RTS1 to the first STA STA1 through the first link L1.

At time t65, the back-off count of the second AP AP2 reaches 0, and transmission of the second RTS frame of the second AP AP2 may be omitted.

At time t75 to time t95, the second STA STA2 may receive the cross-link-related information included in the first CL-RTS frame CL-RTS1 and perform a sensing operation SO on the second link L2 based on the cross-link-related information. For example, the second STA STA2 may receive the cross-link-related information from the first STA STA1. The second STA STA2 may identify that the second link L2 is in a ready state through the sensing operation SO. A performance timing and a performance time of the sensing operation SO shown in FIG. 13A are only examples, and the inventive concepts are not limited thereto. The sensing operation SO for the second link L2 may be performed at an appropriate timing and performance time, so that the first CTS frame CTS1 and the second CTS frame CTS2 may be aligned with each other.

When the first STA STA1 identifies that the first link L1 is in a ready state by sensing the first link L1, at time t95 after a short interframe space SIFS from time t85, the first STA STA1 may transmit the first CTS frame CTS1 to the first AP AP1 through the first link L1. When the second STA STA2 identifies that the second link L2 is in a ready state by sensing the second link L2, at time t95 after a short interframe space SIFS from time t85, the second STA STA2 may transmit the second CTS frame CTS2 to the second AP AP2 through the second link L2.

At time t115 after a short interframe space SIFS from time t105, the first AP AP1 may transmit a first A-MPDU A-MPDU1 to the first STA STA1 through the first link L1, and the second AP AP2 may transmit a second A-MPDU A-MPDU2 to the second STA STA2 through the second link L2.

In FIG. 13B, an operation from time t16 to time t76 may be the same as (or similar to) an operation from time t15 to time t75 of FIG. 13A, and accordingly, an operation after time t76, which is different from that shown in FIG. 13A, is mainly described.

Referring further to FIG. 13B, at time t76 to time t96, the second STA STA2 may receive the cross-link-related information included in the first CL-RTS frame CL-RTS1 and perform a sensing operation SO on the second link L2 based on the cross-link-related information. The second STA STA2 may identify that the second link L2 is in a busy state through the sensing operation SO.

When the first STA STA1 identifies that the first link L1 is in a ready state by sensing the first link L1, at time t96 after a short interframe space SIFS from time t86, the first STA STA1 may transmit the first CTS frame CTS1 to the first AP AP1 through the first link L1. When the second STA STA2 identifies that the second link L2 is in a busy state by sensing the second link L2, the second STA STA2 may not transmit the second CTS frame.

At time t116 after a short interframe space SIFS from time t106, the first AP AP1 may transmit the first A-MPDU A-MPDU1 to the first STA STA1 through the first link L1.

In FIG. 13C, an operation from time t17 to time t77 may be the same as (or similar to) an operation from time t15 to time t75 of FIG. 13A, and accordingly, an operation after time t77, which is different from that shown in FIG. 13A, is mainly described.

Referring further to FIG. 13C, at time t77 to time t97, the second STA STA2 may receive the cross-link-related information included in the first CL-RTS frame CL-RTS1 and perform a sensing operation SO on the second link L2 based on the cross-link-related information. The second STA STA2 may identify that the second link L2 is in a busy state through the sensing operation SO. At this time, the second STA STA2 may sense a state of a third link L3.

When the first STA STA1 identifies that the first link L1 is in a ready state by sensing the first link L1, at time t97 after a short interframe space SIFS from time t87, the first STA STA1 may transmit the first CTS frame CTS1 to the first AP AP1 through the first link L1. When the second STA STA2 identifies that the third link L3 is in a ready state through the sensing operation SO for the third link L3, the second STA STA2 may detect the third link L3 as an alternative link, and at time t97 after a short interframe space SIFS from time t87, the second STA STA2 may transmit the second CTS frame CTS2 to the second AP AP2 through the third link L3, which is an alternative link.

At time t117 after a short interframe space SIFS from time t107, the first AP AP1 may transmit a first A-MPDU A-MPDU1 to the first STA STA1 through the first link L1, and the second AP AP2 may transmit a second A-MPDU A-MPDU2 to the second STA STA2 through the third link L3, which is an alternative link. In embodiments, the second AP AP2 may transmit the second link L2 to the second STA STA2 through the second link L2.

Figure 14A:
FIGS. 14A and 14B are diagrams illustrating formats of a request-to-send (RTS) frame, according to embodiments.
Figure 14B:
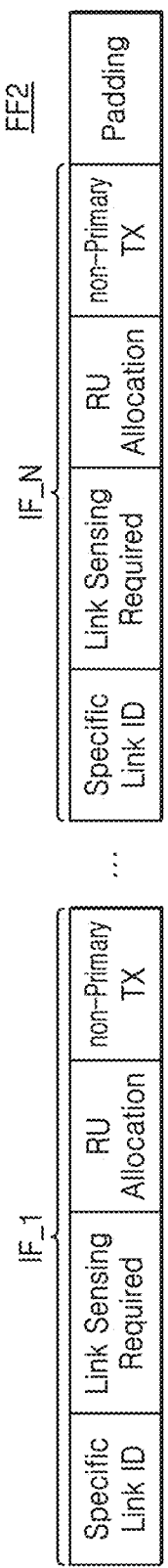

FIGS. 14A and 14B are diagrams illustrating formats of an RTS frame, according to embodiments.

Referring to FIG. 14A, a format FF1 of an RTS frame may include a common field CF in which cross-link-related information for multiple links are arranged and a 'Padding' field in which padding data is arranged. The common field CF may include a 'Link ID' field indicating multiple links, a 'Link Sensing Required' field indicating whether link sensing is to be performed (e.g., is required) for multiple links, an 'RU Allocation' field indicating resources allocated to multiple links for transmission of CTS frames, and a 'non-Primary TX' field indicating whether a CTS frame may be transmitted through an alternative link with respect to multiple links. However, the format FF1 of the RTS frame shown in FIG. 14A is only an example and embodiments are not limited thereto, and the format FF1 of the RTS frame may not include some fields or may further include a field which is not shown in FIG. 14A. In addition, names of fields may be defined as other names. Herein, the common field CF may be defined as a field in which cross-link-related information commonly decoded by a plurality of APs or a plurality of STAs of a device receiving an RTS frame is arranged.

Referring further to FIG. 14B, a format FF2 of an RTS frame may include a plurality of individual fields IF_1 to IF_N and a 'Padding' field in which padding data is arranged. The plurality of individual fields IF_1 to IF_N may each include a 'Specific Link ID' subfield indicating a specific link (e.g., a link identifier (ID)), a 'Link Sensing Required' subfield indicating whether link sensing of a specific link is to be performed (e.g., is required), an RU Allocation' subfield indicating resources allocated to a specific link for CTS frame transmission, and a 'non-Primary TX' subfield indicating whether a CTS frame may be transmitted through an alternative link with respect to a specific link. However, the format FF2 of the RTS frame shown in FIG. 14B is only an example and embodiments are not limited thereto, and the format FF2 of the RTS frame may not include some subfields or may further include a subfield which is not shown in FIG. 14A. In addition, names of subfields may be defined as other names Herein, the plurality of individual fields IF_1 to IF_N may be defined as fields in which cross-link-related information decoded by a specific AP or a specific STA of a device receiving an RTS frame is arranged.

Figure 15:
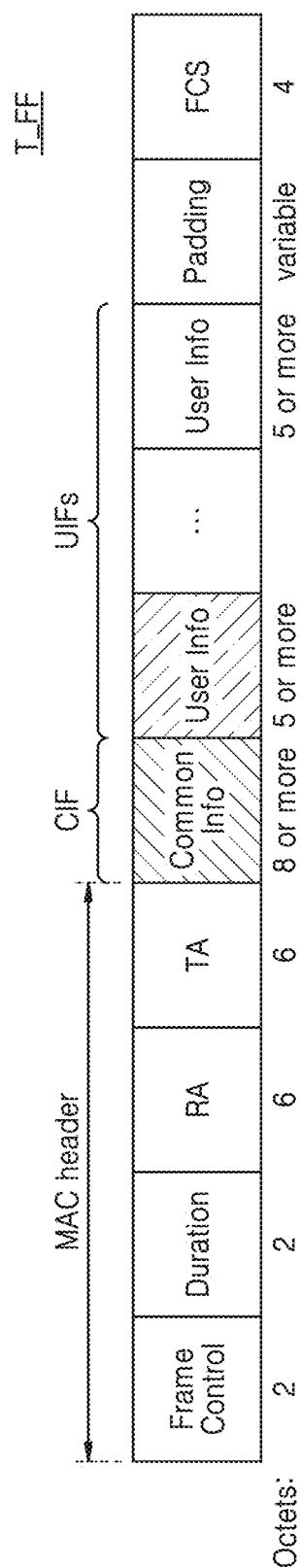
FIG. 15 is a diagram for explaining an example in which cross-link-related information is arranged in a format of a trigger frame, according to embodiments.

FIG. 15 is a diagram for explaining an example in which cross-link-related information is arranged in a format T_FF of a trigger frame, according to embodiments.

Referring to FIG. 15, a format of an RTS frame may correspond to the format T_FF of the trigger frame. The format T_FF of the trigger frame may include a 'Frame Control' field, a 'Duration' field, a 'receiver address (RA)' field, a 'transmitting AP's address (TA)' field, a 'Common Info' field (or a common information field) (CIF), 'User Info' fields (or user information fields) (UIFs), a 'Padding' field, and/or an 'FCS' field. A 'MAC header' may include the 'Frame Control' field, the 'Duration' field, the 'RA' field, and the 'TA' field.

In embodiments, cross-link-related information according to the inventive concepts may be arranged with any one of the CIF and the UIFs.

FIG. 16 is a diagram for explaining formats of a trigger frame that may be adopted for a format of an RTS frame, according to embodiments.

Referring to FIG. 16, according to IEEE 802.11.ax, formats of a trigger frame may include a 'Basic Trigger Frame' format, a 'Beamforming Report (BFRP)' format, a 'Multi-user block ack request (MU-BAR)' format, a 'Multi-user request to send (MU-RTS)' format, a 'Buffer Status Report (BSRP)' format, a 'GCR (groupcast with retries) MU-BAR' format, a 'Bandwidth Query Report (BQRP)' format, and/or an 'neighbor discovery protocol (NDP) Feedback Report Poll (NFRP)' format.

Figure 17:
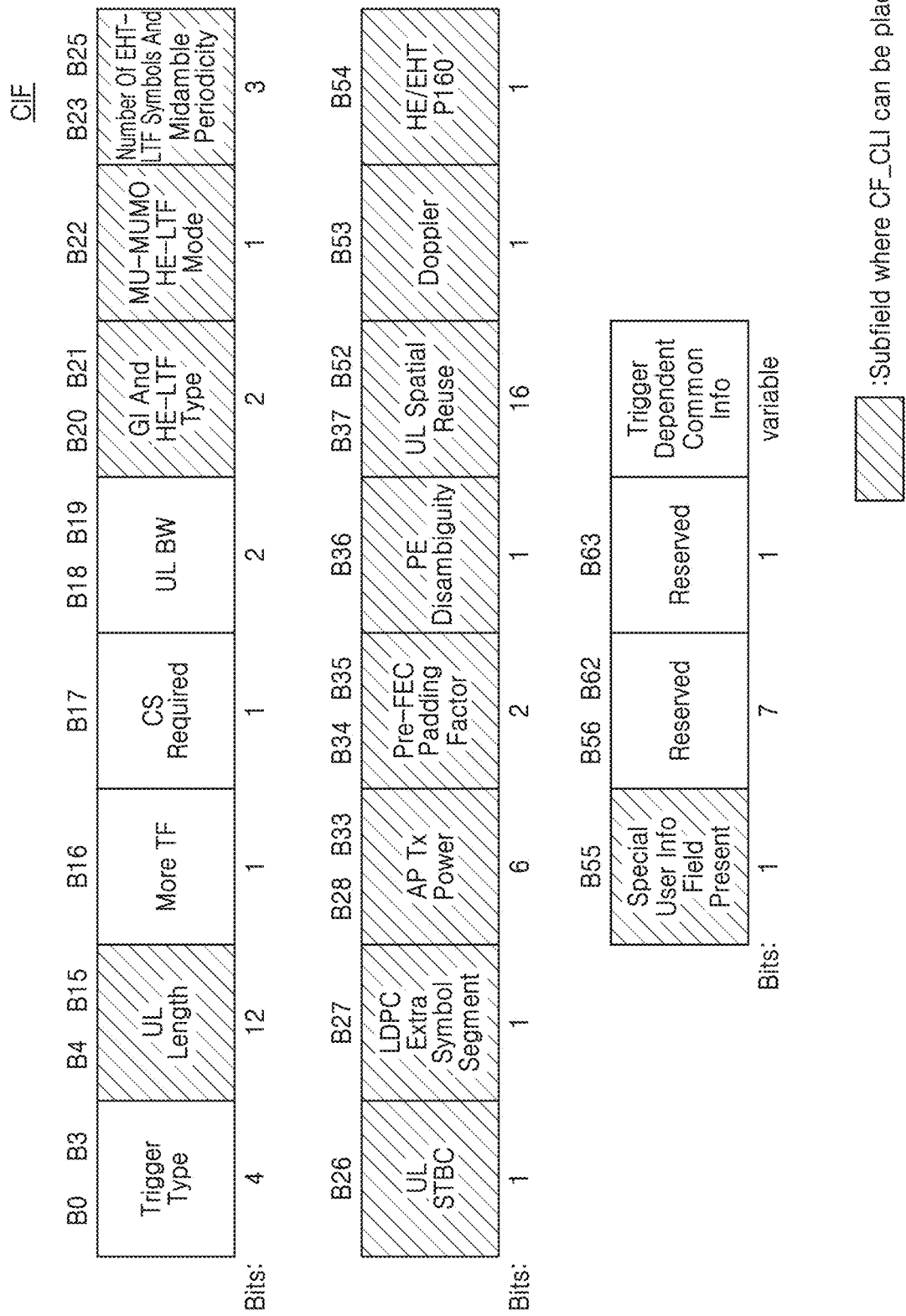
FIGS. 17 and 18 are diagrams for explaining an RTS frame employing an 'MU-RTS' format, according to embodiments.
Figure 18:
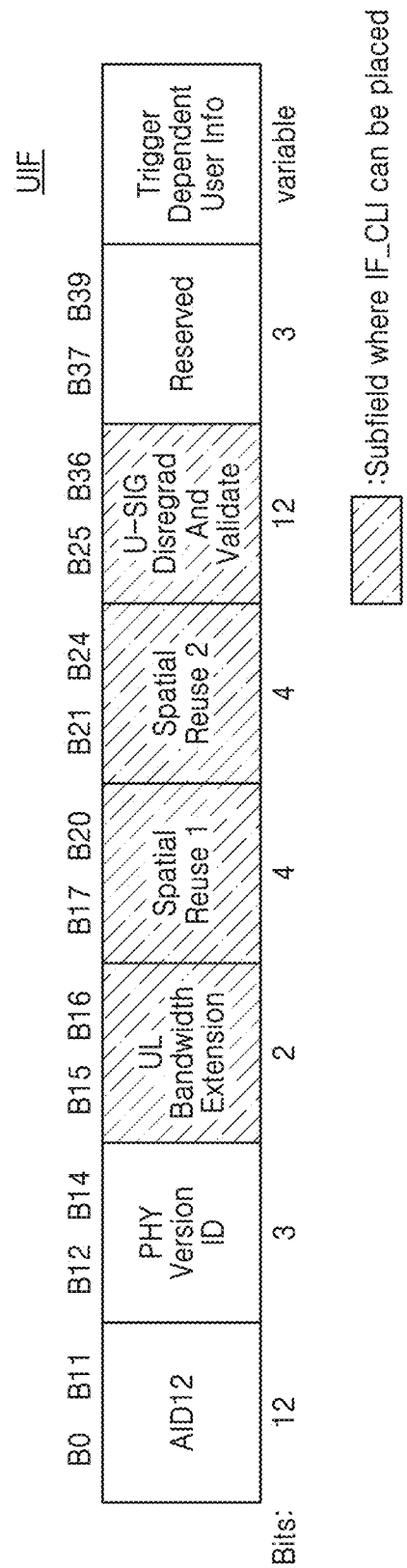

In embodiments, any one of a plurality of formats may be employed for the format of an RTS frame. However, this is an example, and the inventive concepts are not limited thereto. For the format of an RTS frame, any one of the formats of any frame defined in more various standards may be employed. FIGS. 17 and 18 are described on a premise that a 'Multi-user request to send' format (hereinafter, referred to as a 'MU-RTS' format) is employed in the format of an RTS frame.

FIGS. 17 and 18 are diagrams for explaining an RTS frame employing an 'MU-RTS' format, according to embodiments. Hereinafter, descriptions are made with further reference to FIG. 15 for better understanding.

Referring to FIGS. 15 and 17, a common information field CIF may include a 'Trigger Type' subfield, a 'UL Length' subfield, a 'More TF subfield, a 'CS Required' subfield, a 'UL BW' subfield, a 'GI AND HE-LTF Type' subfield, a 'MU-MIMO HE-LTF Mode' subfield, a 'Number of EHT-LTF Symbols And Midamble Periodicity' subfield, a 'UL STBC' subfield, a 'LDPC Extra Symbol Segment' subfield, an 'Ap Tx Power' subfield, a 'Pre-FEC Padding Factor' subfield, a 'PE Disambiguity' subfield, a 'UL Spatial Reuse' subfield, a 'Doppler' subfield, a 'HE/EHT P160' subfield, a 'Special User Info Field Present' subfield, 'Reserved' subfields, and/or a 'Trigger Dependent Common Info' subfield.

In a 'MU-RTS' format, the 'UL Length' subfield, the 'GI And HE-LTF Type' subfield, the 'MU-MIMO HE-LTF Mode' subfield, the 'Number Of EHT-LTF Symbols And Midamble Periodicity' subfield, the 'UL STBC' subfield, the 'LDPC Extra Symbol Segment' subfield, the 'AP Tx Power' subfield, the 'Pre-FEC Padding Factor' subfield, the 'PE Disambiguity' subfield, the 'UL Spatial Reuse' subfield, the 'Doppler' subfield, the 'HE/EHT P160' subfield, and/or the 'Special User Info Field Present' subfield may not be used, and the 'MU-RTS' format may be in a reserved state so that other data may be arranged.

In embodiments, cross-link-related information CF-CLI arranged in the common field CF in FIG. 14A may be arranged in at least one of the 'UL Length' subfield, the 'GI And HE-LTF Type' subfield, the 'MU-MIMO HE-LTF Mode' subfield, the 'Number Of EHT-LTF Symbols And Midamble Periodicity' subfield, the 'UL STBC' subfield, the 'LDPC Extra Symbol Segment' subfield, the 'AP Tx Power' subfield, the 'Pre-FEC Padding Factor' subfield, the 'PE Disambiguity' subfield, the 'UL Spatial Reuse' subfield, the 'Doppler' subfield, the 'HE/EHT P160' subfield, and/or the 'Special User Info Field Present' subfield. In embodiments, the cross-link-related information CF-CLI may also be arranged in the 'Reserved' subfields.

Referring further to FIG. 18, at least one user information field UIF may include an 'AID12' subfield, a 'PHY Version ID' subfield, a 'UL Bandwidth Extension' subfield, a 'Spatial Reuse 1' subfield, a 'Spatial Reuse 2' subfield, a 'U-SIG Disregard And Validate' subfield, a 'Reserved' subfield, and/or a 'Trigger Dependent User Info' subfield.

In the 'MU-RTS' format, the 'UL Bandwidth Extension' subfield, the 'Spatial Reuse 1' subfield, the 'Spatial Reuse 2' subfield, and/or the 'U-SIG Disregard And Validate' subfield may not be used, and the 'MU-RTS' format may be in a reserved state so that other data may be arranged.

In embodiments, cross-link-related information IF-CLI arranged in any one of the plurality of individual fields IF_1 to IF_N in FIG. 14B may be arranged in at least one of the 'UL Bandwidth Extension' subfield, the 'Spatial Reuse 1' subfield, the 'Spatial Reuse 2' subfield, and/or the 'U-SIG Disregard And Validate' subfield. In embodiments, the cross-link-related information IF-CLI may also be arranged in the 'Reserved' subfield.

Figure 19:
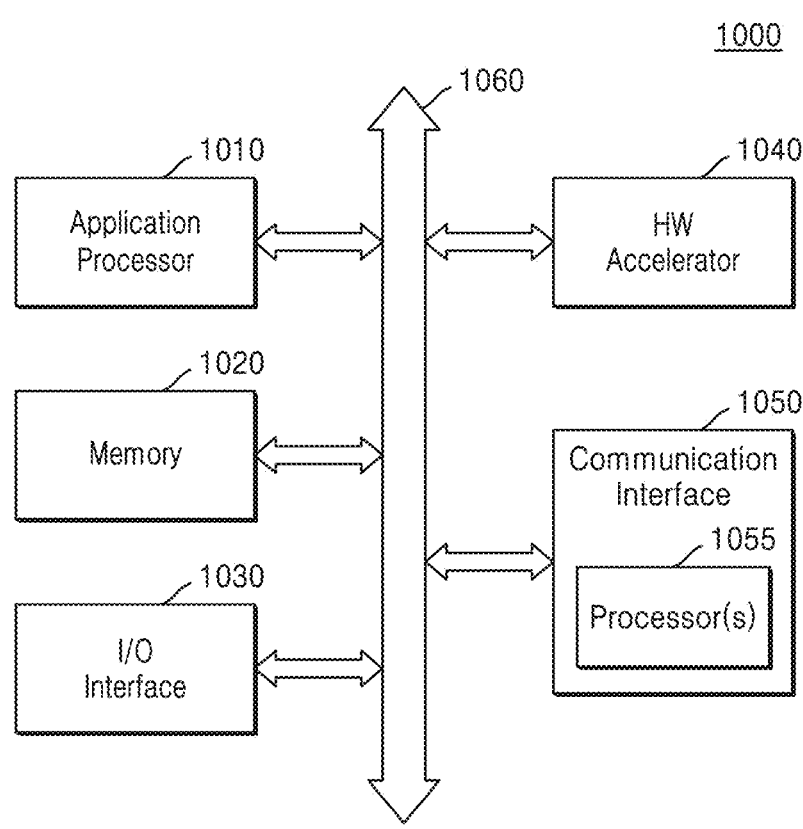
FIG. 19 is a block diagram of a system according to embodiments.

FIG. 19 is a block diagram of a system 1000 according to embodiments. In embodiments, the system 1000 of FIG. 19 may be implemented with at least one chip, and the system 1000 implemented with one chip may be referred to as a system-on-chip.

Referring to FIG. 19, the system 1000 may include an application processor 1010, a memory 1020, an input/output interface 1030, a hardware accelerator 1040, and/or a communication interface 1050. The application processor 1010, the memory 1020, the input/output interface 1030, the hardware accelerator 1040, and/or the communication interface 1050 may communicate with each other through a bus 1060.

The application processor 1010 may control the system 1000. For example, the application processor 1010 may include at least one core, and each of the at least one core may execute a series of instructions stored in the memory 1020. In embodiments, the application processor 1010 may execute an operating system (OS), and may execute applications on the OS. The application processor 1010 may control other components of the system 1000. For example, the application processor 1010 may provide data to the hardware accelerator 1040 to instruct the hardware accelerator 1040 to perform an operation, and may obtain a result of the operation performed by the hardware accelerator 1040. Also, the application processor 1010 may provide data to be transmitted to the outside to the communication interface 1050 to instruct transmission of the data, and may also obtain data received from the outside through the communication interface 1050.

The memory 1020 may be accessed by other components via the bus 160. The memory 1020 may have any structure capable of storing data, for example, a volatile memory, such as static random access memory (SRAM), and dynamic random access memory (DRAM), and/or a non-volatile memory, such as flash memory, and resistive random access memory (RRAM). The memory 1020 may store instructions executed by the application processor 1010 and may also store data read or written by other components.

The input/output interface 1030 may provide an interface for input to the system 1000 and output from the system 1000. For example, the input/output interface 1030 may communicate with an input/output device included in a product together with the system 1000, and may receive a user's input or provide an output to the user through the input/output device. In addition, the input/output interface 1030 may communicate with peripherals included in the product together with the system 1000, and may enable the application processor 1010 to control the peripherals.

The hardware accelerator 1040 may be hardware designed to perform a function at high speed. For example, the hardware accelerator 1040 may be designed to perform encoding and decoding of data at high speed. Also, the hardware accelerator 1040 may be designed to perform neural processing at high speed. The hardware accelerator 1040 may process data stored in the memory 1020 and store the processed data in the memory 1020.

The communication interface 1050 may provide a communication channel with an external object of the system 1000. For example, the communication interface 1050 may provide a wired communication channel and/or a wireless communication channel. In embodiments, the communication interface 1050 may perform at least one operation included in the method for wireless communication using a multi-link described with reference to the drawings. For example, the communication interface 1050 may include at least one processor 1055, and the at least one processor 1055 may execute instructions to perform at least one operation included in a method for wireless communication using a multi-link described above. In embodiments, the at least one processor 1055 may execute instructions stored in the memory 1020 or a memory included in the communication interface 1050. In embodiments, the memory 1020 or a memory included in the communication interface 1050 may store information collected about links, and may be accessed by the at least one processor 1055.

Figure 20:
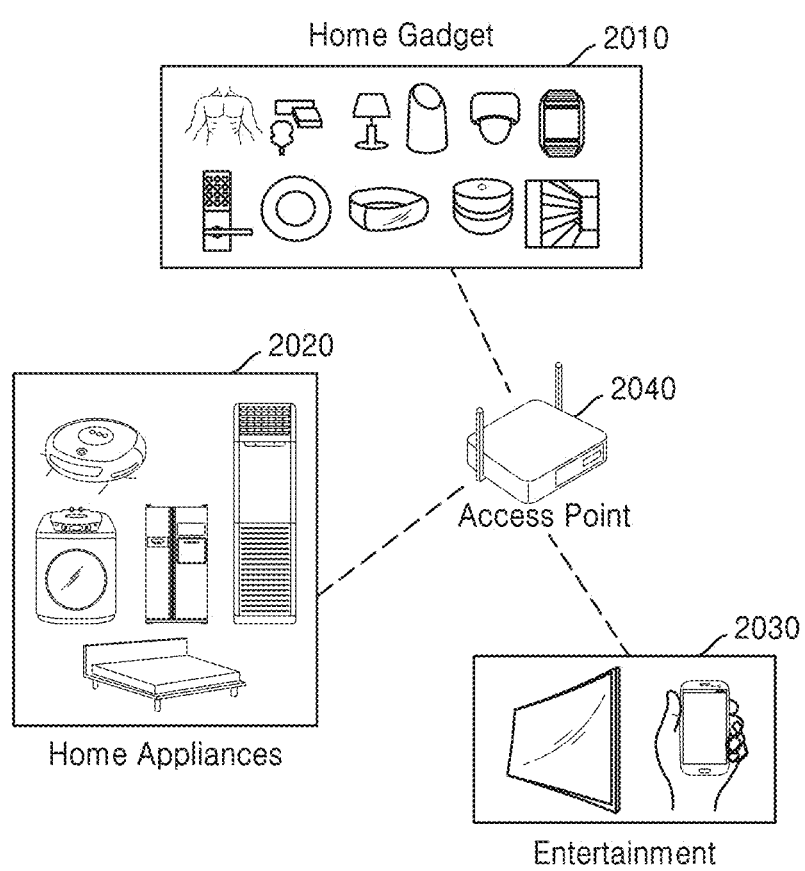
FIG. 20 is a diagram illustrating examples of a device for wireless communication according to embodiments.

FIG. 20 is a diagram illustrating examples of a device for wireless communication according to embodiments. In particular, FIG. 20 shows an Internet of Things (IoT) network system including a home gadget 2010, a home appliance 2020, an entertainment device 2030, and/or an AP 2040.

In embodiments, in devices for wireless communication of FIG. 20, as described above with reference to the drawings, an operation using a multi-link may be performed. Accordingly, devices for wireless communication may smoothly perform signaling of a protection mechanism by minimizing or reducing interference between links when transmitting and receiving RTS frames and CTS frames in a mutual protection mechanism using a multi-link. Accordingly, high reliability of data communication between devices may be ensured or improved.

Conventional devices and methods for performing multi-link communication experience excessive amounts of mutual interference in communication links (e.g., between non-STA link pairs) between the devices. This excessive interference interferes with protection mechanism signaling (e.g., RTS signaling, CTS signaling, etc.) between the devices, thereby reducing the effectiveness of the protection mechanism signaling and reducing the reliability of data communication between the devices.

However, according to embodiments, improved devices and methods are provided for multi-link communication. For example, the improved devices and methods may generate an RTS frame based on a determination of at least one of an additional length and/or cross-link-related information. Through the use of the at least one of the additional length and/or cross-link-related information, the protection mechanism signaling (e.g., RTS signaling, CTS signaling, etc.) between devices may be aligned in a time-dimension, thereby reducing mutual interference in communication links between the devices. Alternatively, the protection mechanism signaling transmitted by one of the devices may be omitted based on the cross-link-related information to reduce the mutual interference in the communication links. Therefore, the improved devices and methods overcome the deficiencies of the conventional devices and methods to at least improve the effectiveness of the protection mechanism signaling by reducing the mutual interference, and thus, improve the reliability of data communication between the devices.

According to embodiments, operations described herein as being performed by the wireless communication system 10, the first to sixth devices D1_1, D1_2, D2_1, D2_2, D2_3, and D2_4, the AP MLD 100, the non-AP MLD 200, the wireless communication system 20, the RFIC 110, the processor 120, the first to n-th transceivers 111_1 to 111_$n$, the RFIC 210, the processor 220, the first to m-th transceivers 211_1 to 211_$m$, the frame alignment circuitry 121, AP MLD 300, the non-AP MLD 400, the wireless communication system 30; the first to third APs AP1, AP2, and AP3, the first to third STAs STA1, STA2, and STA3, the AP MLD 500, the non-AP MLD 600, the k-th AP APk, the other APs APs, the a k-th STA, the other STAs STAs, the system 1000, the application processor 1010, the input/output interface 1030, the hardware accelerator 1040, the communication interface 1050, the at least one processor 1055, the home gadget 2010, the home appliance 2020, the entertainment device 2030, and/or the AP 2040 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

It will be understood that when an element is referred to as being "connected" or "coupled" to another element, it may be directly connected or coupled to the other element or intervening elements may be present. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. A wireless communication method of a first device with a second device using multiple links, the multiple links comprising a first link and a second link, and the method comprising:
    obtaining transmission-related information in response to entering a transmission preparation period of a first request-to-send (RTS) frame through the first link, the transmission-related information corresponding to a second RTS frame associated with the second link;
    determining cross-link-related information of the first RTS frame based on the transmission-related information; and
    determining whether to transmit the second RTS frame based on the at least one of the additional length or the cross-link-related information of the first RTS frame,
    wherein determining the cross-link-related information of the first RTS frame comprises:
        identifying a transmission timing of the second RTS frame based on the transmission-related information,
        identifying whether the first link and the second link have a cross-link relationship based on a difference between a transmission timing of the first RTS frame and the transmission timing of the second RTS frame,
        determining the cross-link-related information of the first RTS frame based on whether the first link and the second link have the cross-link relationship to obtain determined cross-link-related information, and
    filling the first RTS frame with data corresponding to the determined cross-link-related information.

2. The wireless communication method of claim 1, wherein the determining whether to transmit the second RTS frame comprises determining to omit transmission of the second RTS frame based on the first link and the second link being in the cross-link relationship.

3. The wireless communication method of claim 1, wherein
    a format of the first RTS frame comprises a plurality of fields corresponding to the cross-link-related information; and
    the plurality of fields comprise a first field indicating the multiple links, a second field indicating whether link sensing is to be performed for the multiple links, and a third field indicating resources allocated to the multiple links for transmission of clear-to-send (CTS) frames.

4. The wireless communication method of claim 3, wherein the plurality of fields comprise at least one of:
    a fourth field indicating whether transmission of the CTS frame is possible through an alternative link with respect to the multiple links; and
    a padding field filled with padding data having a variable length according to the additional length of the first RTS frame.

5. The wireless communication method of claim 1, wherein
    a format of the first RTS frame comprises a plurality of individual fields corresponding to the cross-link-related information; and
    each of the plurality of individual fields comprises a first subfield indicating a specific link, a second subfield indicating whether link sensing is to be performed for the specific link, and a third subfield indicating resources allocated to the specific link for transmission of a clear-to-send (CTS) frame.

6. The wireless communication method of claim 5, wherein each of the plurality of individual fields comprises a fourth subfield indicating whether transmission of the CTS frame is possible through an alternative link with respect to the specific link.

7. The wireless communication method of claim 5, wherein the format of the first RTS frame comprises a padding field in which padding data having a variable length is arranged according to the additional length of the first RTS frame.

8. The wireless communication method of claim 1, wherein a format of the first RTS frame corresponds to any one of a plurality of trigger frame types corresponding to an IEEE 802.11ax standard.

9. The wireless communication method of claim 8, wherein
the format of the first RTS frame comprises a common information field and a user information field; and
the cross-link-related information of the first RTS frame is arranged in any one of the common information field or the user information field.

10. A first device configured to communicate with a second device using multiple links, the multiple links comprising a first link and a second link, and the first device comprising:
a radio frequency (RF) integrated circuit configured to provide access points respectively corresponding to the first link and the second link; and
processing circuitry configured to,
obtain transmission-related information in a transmission preparation period of a first request-to-send (RTS) frame through the first link, the transmission-related information corresponding to a second RTS frame associated with the second link,
determine cross-link-related information of the first RTS frame based on the transmission-related information, and
determine whether to transmit the second RTS frame based on the at least one of the additional length or the cross-link-related information of the first RTS frame,
wherein a format of the first RTS frame comprises at least one of (i) a plurality of fields corresponding to the cross-link-related information or (ii) a plurality of individual fields corresponding to the cross-link-related information of the first RTS frame, and
wherein the plurality of fields comprise at least one of a first field indicating the multiple links, a second field indicating whether link sensing is to be performed for the multiple links, a third field indicating resources allocated to the multiple links for transmission of clear-to-send (CTS) frames, a fourth field indicating whether transmission of the CTS frames is possible through an alternative link with respect to the multiple links, or a fifth field filled with padding data having a variable length according to the additional length of the first RTS frame.

11. The first device of claim 10, wherein
each of the plurality of individual fields comprises at least one of a first subfield indicating a specific link, a second subfield indicating whether link sensing is to be performed for the specific link, a third sub-field indicating resources allocated to the specific link for transmission of clear-to-send (CTS) frames, and a fourth subfield indicating whether transmission of the CTS frames is possible through an alternative link with respect to the specific link.

12. The first device of claim 10, wherein the processing circuitry is configured to control the access points to:
transmit the first RTS frame to the second device through the first link, the first RTS frame comprising the cross-link-related information; and
omit transmitting the second RTS frame to the second device through the second link.

13. The first device of claim 12, wherein
the access points include a first access point and a second access point;
the first access point is configured to receive a first clear-to-send (CTS) frame via the first link from the second device based on the first RTS frame; and
the second access point is configured to receive a second CTS frame via the second link from the second device based on the first RTS frame, the first CTS frame and the second CTS frame being mutually aligned.

14. A wireless communication system comprising:
a first device; and
a second device, the first device and the second device being configured to communicate with each other through multiple links, wherein
the first device is configured to determine cross-link-related information of a first request-to-send (RTS) frame among a plurality of RTS frames based on transmission-related information of the plurality of RTS frames through the multiple links, and generate the first RTS frame based on the at least one of the additional length or cross-link-related information to transmit the first RTS frame to the second device through a first link among the multiple links,
wherein the first device is configured to:
generate the first RTS frame based on the cross-link-related information; and
omit transmission of a second RTS frame among the plurality of RTS frames to the second device through a second link of the multiple links based on transmission of the first RTS frame.

15. The wireless communication system of claim 14, wherein the second device is configured to:
sense the second link based on the cross-link-related information based on the first RTS frame to obtain a sensing result; and
determine whether to transmit a clear-to-send (CTS) frame to the first device through the second link based on the sensing result.

16. The wireless communication system of claim 15, wherein the second device is configured to:
determine to transmit the CTS frame to the first device through the second link in response to the sensing result indicating that the second link is in a ready state; and
determine to transmit the CTS frame to the first device through an alternative link in response to the sensing result indicating that the second link is in a busy state.

\* \* \* \* \*